(12) United States Patent
Kuribayashi et al.

(10) Patent No.: US 6,970,406 B2
(45) Date of Patent: Nov. 29, 2005

(54) INFORMATION PLAYBACK APPARATUS, SIGNAL PROCESSING APPARATUS, AND INFORMATION PLAYBACK METHOD FOR DETECTING AND CANCELING CROSSTALK

(75) Inventors: Hiroki Kuribayashi, Tsurugashima (JP); Takuma Yanagisawa, Tsurugashima (JP); Hiroshi Ogawa, Kanagawa-ken (JP)

(73) Assignees: Pioneer Corporation, Tokyo-to (JP); Sony Corporation, Tokyo-to (JP)

( * ) Notice: Subject to any disclaimer, the term of this patent is extended or adjusted under 35 U.S.C. 154(b) by 537 days.

(21) Appl. No.: 10/094,621

(22) Filed: Mar. 12, 2002

(65) Prior Publication Data

US 2002/0131352 A1 Sep. 19, 2002

(30) Foreign Application Priority Data

Mar. 13, 2001 (JP) .......................... P2001-070465

(51) Int. Cl.[7] .......................... G11B 7/005; G11B 5/09
(52) U.S. Cl. .............................. 369/47.19; 369/47.17; 369/53.33
(58) Field of Search .................... 369/47.17, 47.19, 369/53.33, 47.31, 53.35

(56) References Cited

U.S. PATENT DOCUMENTS 5,280,466 A * 1/1994 Tomita ..................... 369/275.1
5,587,985 A 12/1996 Sano et al. ................. 369/124
5,729,514 A * 3/1998 Horigome et al. ........ 369/47.17
6,614,745 B1 * 9/2003 Takeda et al. ......... 369/124.13

FOREIGN PATENT DOCUMENTS

| JP | 8-249668 | 9/1996 |
| JP | 10-069646 | 3/1998 |
| JP | 2000-163809 | 6/2000 |
| JP | 2001-34977 | 2/2001 |
| WO | WO 99/48091 | 9/1999 |

* cited by examiner

*Primary Examiner*—William Klimowicz
*Assistant Examiner*—Lixi Chow
(74) *Attorney, Agent, or Firm*—Drinker Biddle & Reath LLP

(57) ABSTRACT

An information playback apparatus of the present invention is provided with: a first detecting unit for supplying a difference between respective output signals optically obtained by a pair of detectors for reading the information of the first track; a second detecting unit for supplying a difference between respective output signals optically obtained by a pair of detectors for reading the information of the second track adjacent to the first track; a first demodulating unit for demodulating a detected signal supplied from the first detecting unit, a second demodulating unit for demodulating a detected signal supplied from the second detecting unit. A coefficient controlling unit extracts the crosstalk caused by the second track, which is included in a demodulation signal obtained by the first demodulating unit, from the same signal and controls a coefficient based on the extracted crosstalk, and cancels the crosstalk by the calculated coefficient.

26 Claims, 14 Drawing Sheets

ERROR DETECTION IMAGE ON THE CHRONOLOGICAL WAVEFORM

ERROR DETECTION BLOCK DIAGRAM

ERROR DETECTION IMAGE ON THE CHRONOLOGICAL WAVEFORM

ERROR DETECTION IMAGE ON THE CHRONOLOGICAL WAVEFORM

INFORMATION PLAYBACK APPARATUS, SIGNAL PROCESSING APPARATUS, AND INFORMATION PLAYBACK METHOD FOR DETECTING AND CANCELING CROSSTALK

BACKGROUND OF THE INVENTION

1. Field of the Invention

The present invention relates to an information playback apparatus, a signal processing apparatus, an information playback method, and an optical recording medium for use in reproducing information on an optical recording medium, and more particularly to an optical recording medium having short intervals of tracks, and an information playback apparatus, a signal processing apparatus, and an information playback method for use in reproducing information on the optical recording medium.

2. Description of the Related Art

Recently, optical discs represented by CD and DVD are used practically. Specifically, CD-R (CD-Recordable) which can record digital data only once and CD-RW (CD-ReWritable) which can rewrite digital data a plurality of times, as well as CD-DA (CD-Digital Audio) that is a recording medium for playback-only, have been put into practical use.

At a time of recording and reproducing in an optical disc, it is necessary to rotate the optical disc at a predetermined speed. A playback-only recording medium can determine a predetermined speed by synchronizing the rotating speed with the reproducing frequency of digital data at playback. Contrarily, a recordable recording medium such as CD-R and CD-RW cannot control the rotating speed in the above way, because digital data is not initially recorded on the tracks. Therefore, in the recordable medium, tracks are wobbled in correspondence with address information, thereby controlling a rotating speed based on wobble signals read from the tracks and recognizing the addresses of the tracks.

As a recording method of the address information by wobbling, which is now in practical use, a method of wobbling a track according to an FM-modulated wobble signal is known. A method of wobbling tracks according to the address information by phase-modulation of a wobble signal is disclosed in U.S. Pat. No. 5,999,504 (corresponding to Japanese Patent Publication Laid-Open No. H10-69646).

On the other hand, further improvement in recording density is desired to an optical disc. When increasing the recording density of an optical disc, a space between spiral tracks (the space in the radius direction of an optical disk) cannot help getting narrower. Therefore, it becomes difficult to thoroughly focus a laser spot on a predetermined track, and there is a problem of generating crosstalk from adjacent tracks.

In a conventional apparatus, crosstalk of an RF signal is eliminated on the basis of an error between an actual signal from a photo-detector and an ideal signal.

However, when recording the address data by phase modulation of wobble, the wobble signal waveform becomes a sine wave. This is why a carrier signal, which carries address data is recorded by wobbling the group in an analog way. Generally, it is difficult to detect the error (crosstalk amount) from this analog signal waveform. A signal before actual demodulation has a random noise and it becomes very noisy. Therefore, it is practically impossible to detect an error.

SUMMARY OF THE INVENTION

In consideration of the above problem, it is an object of the present invention to provide an information playback apparatus, an information playback method, and an optical recording medium capable of eliminating crosstalk from the adjacent tracks even in a wobble signal.

The above object of the present invention can be achieved by an information playback apparatus for reading information of an optical recording medium, according to the present invention. The apparatus is provided with: a first detecting device (152) which supplies a difference between respective output signals optically obtained by a pair of detectors for reading information of a first track (MT); a second detecting device (151) which supplies a difference between respective output signals optically obtained by a pair of detectors for reading information of a second track (ST1) adjacent to the first track (MT); a first demodulating device (202) which demodulates a detected signal supplied from the first detecting device (152); a second demodulating device (201) which demodulates a detected signal supplied from the second detecting device (151); a crosstalk extracting device (205) which extracts crosstalk caused by the second track (ST1), which is included in a demodulation signal obtained by the first demodulating device (202), from the same signal; a coefficient controlling device (205) for controlling a coefficient based on the crosstalk extracted by the crosstalk extracting device (205); and a crosstalk canceling device (211) which cancels the above crosstalk on the basis of the coefficient calculated by the coefficient controlling device (205).

According to the present invention, the information playback apparatus can extract the crosstalk caused by the second track, which is included in a demodulation signal, control the coefficient based on this extracted crosstalk, and cancel the crosstalk by this coefficient, thereby canceling the crosstalk effectively, and eliminating the crosstalk, for example, also in the wobble signal.

In one aspect of the present invention, the coefficient controlling device (205) calculates a correlation between the crosstalk extracted by the crosstalk extracting device (205) and the demodulation signal obtained by the second demodulating device (201) and controls the coefficient for use in the crosstalk canceling device (211) so as to reduce a correlation.

According to this aspect, the crosstalk can be eliminated effectively by controlling a correlation between an error included in a demodulation signal demodulated by the first demodulating device (202) and the demodulation signal obtained by the second demodulating device (201) to a small value.

In another aspect of the present invention, the crosstalk canceling device may cancel the crosstalk in a signal before demodulation by the first demodulating device, and alternatively it may cancel the crosstalk in a demodulated signal by the first demodulating device.

In further aspect of the present invention, the first detecting device (152) and the second detecting device (151) may detect wobbles of tracks formed on an optical recording medium.

According to this aspect, the crosstalk in the wobble signal can be eliminated effectively.

In further aspect of the present invention, the first demodulating device (202) and the second demodulating device (201) may demodulate phase-modulated wobbles.

In further aspect of the present invention, the information playback apparatus is further provided with a positional deviation compensating device (217) for compensating timing corresponding to each positional deviation of the first detecting device (152) and the second detecting device (151) in a direction of reading information, in which a control in the crosstalk canceling device (211) may be performed in a state of adjusting timing between a signal obtained through the first detecting device (152), the signal being adjusted in good timing by the positional deviation compensating device (217), and a signal obtained through the second detecting device.

According to this aspect, since the phase of a signal obtained through the second detecting device (151) corresponds to the actual crosstalk, the crosstalk can be eliminated effectively.

In further aspect of the present invention, the information playback apparatus is further provided with a carrier signal reading device for reading a carrier signal of the first track (MT), the carrier signal being supplied to the second demodulating device (201), and a phase adjusting device for adjusting phase of the carrier signal in accordance with phases of the output signals of the first detecting device (152) and the second detecting device (151).

According to this aspect, since the phase of the signal obtained through the second detecting device (151) corresponds to the actual crosstalk, the crosstalk can be eliminated effectively.

In further aspect of the present invention, the crosstalk extracting device (205) may extract the crosstalk by comparison between the value of an output signal of the first demodulating device (202) having the crosstalk canceled and two reference levels.

According to this aspect, since the two reference levels are used in an error detection, the crosstalk component can be eliminated efficiently.

In further aspect of the present invention, the crosstalk extracting device (205) may extract the crosstalk based on a signal level at a zero cross point in the output signal of the first demodulating device (202) having the crosstalk canceled.

According to this aspect, since an error is detected based on the signal level at a zero cross point, the crosstalk component can be detected efficiently.

In further aspect of the present invention, the crosstalk extracting device (205) may extract the crosstalk by comparison of the value of an output signal of the first demodulating device (202) having the crosstalk canceled and the value at a zero cross point of the output signal with three reference levels.

According to this aspect, since an error is detected based on the three reference levels, the crosstalk component can be detected efficiently and according to an increase in the number of samples, the influence of noise can be reduced.

The above object of the present invention can be achieved by an information playback apparatus for reading information of an optical recording medium, according to the present invention. The apparatus is provided with: a first detecting device (152) which supplies a difference between respective output signals optically obtained by a pair of detectors for reading information of a first track (MT); a second detecting device (151) and a third detecting device (152) which respectively supplies a difference between output signals optically obtained by each pair of detectors for reading respective information of a second track (ST1) and a third track (ST2) on the both sides adjacent to the first track (MT); a first demodulating device (202) which demodulates a detected signal supplied from the first detecting device (152); a second demodulating device (201) which demodulates a detected signal supplied from the second detecting device (151); a third demodulating device (203) which demodulates a detected signal supplied from the third detecting device (153); crosstalk extracting devices (205, 206) which extracts crosstalk caused by the second track (ST1) and the third track (ST2), which is included in a demodulation signal obtained by the first demodulating device (202), from the same signal; coefficient controlling devices (205, 206) for controlling coefficients based on the crosstalk extracted by the crosstalk extracting devices (205, 206); and crosstalk canceling devices (211, 212) which cancels the above crosstalk on the basis of the coefficients calculated by the coefficient controlling devices (205, 206).

According to the present invention, since the crosstalk caused by the second track and the third track, which is included in the demodulation signal, is extracted from the same signal, the coefficients are controlled based on the extracted crosstalk, and the crosstalk is canceled by the coefficients, the crosstalk can be canceled effectively, and the crosstalk, for example, also in the wobble signal can be eliminated.

In one aspect of the present invention, the coefficient controlling devices (205) calculate a correlation between the crosstalk extracted by the crosstalk extracting device (205) and the demodulation signal obtained by the second demodulating device (201) and a correlation between the crosstalk extracted by the crosstalk extracting device (205) and the demodulation signal obtained by the third demodulating device (203), and controls the coefficients for use in the crosstalk canceling devices (211, 212) so as to make a correlation small.

According to this aspect, a correlation between the error included in the demodulation signal demodulated by the first demodulating device (202) and the demodulation signal obtained by the second demodulating device (201), and a correlation between the error included in the demodulation signal demodulated by the first demodulating device (202) and the demodulation signal obtained by the third demodulating device (203) are controlled to small values, thereby eliminating the crosstalk effectively.

In another aspect of the present invention, the crosstalk canceling device may cancel the crosstalk in a signal before demodulation by the first demodulating device, and alternatively it may cancel the crosstalk in a demodulated signal by the first demodulating device.

In further aspect of the present invention, the first detecting device (152), the second detecting device (151), and the third detecting device (153) may detect wobbles of tracks formed on an optical recording medium.

According to this aspect, the crosstalk in the wobble signal can be eliminated effectively.

In further aspect of the present invention, the first demodulating device (202), the second demodulating device (201), and the third demodulating device (203) demodulate phase-modulated wobbles.

In further aspect of the present invention, the information playback apparatus is further provided with a positional deviation compensating device (217, 218) which compensates timing corresponding to positional deviations of the first detecting device (152), the second detecting device (151), and the third detecting device (153) in a direction of reading information, wherein a control in the crosstalk canceling device (211, 212) may be performed in a state of adjusting timing among a signal obtained through the first detecting device (152), the signal being adjusted in good timing by the positional deviation compensating device (217, 218), a signal obtained through the second detecting device (151), and a signal obtained through the third detecting device (153).

According to this aspect, since the phase of the signal obtained through the second detecting device (151) and the signal obtained through the third detecting device (153) correspond to the actual crosstalk, the crosstalk can be eliminated effectively.

In further aspect of the present invention, the information playback apparatus according to the present invention may comprise: a carrier signal reading device (202b) which reads a carrier signal of the first track (MT), the carrier signal being supplied to the second demodulating device (201) and the third demodulating device (203); and phase adjusting devices (217, 218) which adjusts the phases of the carrier signals according to the phases of the output signals of the first detecting device, the second detecting device, and the third detecting device.

According to this aspect, since the phases of the signal obtained through the second detecting device (151) and the signal obtained through the third detecting device (153) correspond to the actual crosstalk, the crosstalk can be eliminated effectively.

In further aspect of the present invention, the crosstalk extracting device (205) may extract the crosstalk by comparison between the value of an output signal of the first demodulating device (202) having the crosstalk canceled and two reference levels.

According to this aspect, since the two reference levels are used in an error detection, the crosstalk component can be detected efficiently.

In further aspect of the present invention, the crosstalk extracting device (205) may extract the crosstalk based on a signal level at a zero cross point in the output signal of the first demodulating device (202) having the crosstalk canceled.

According to this aspect, since the error is detected based on the signal level at a zero cross point, the crosstalk component can be detected efficiently.

In further aspect of the present invention, the crosstalk extracting device (205) may extract the crosstalk by comparison of the value of an output signal of the first demodulating device (202) having the crosstalk canceled and the value at a zero cross point of the output signal with three reference levels.

According to this aspect, since the error is detected based on the three reference levels, the crosstalk component can be detected efficiently, and according to an increase in the number of samples, the influence of noise can be reduced.

The above object of the present invention can be achieved by an optical recording medium with tracks wobbled, according to the present invention. In the optical recording medium, the wobble of the track is formed in a shape of canceling the crosstalk from the second track adjacent to the first track at playback of the first track.

According to the present invention, since the crosstalk from the second track is canceled at playback of the first track, the accurate wobble signal can be obtained.

In one aspect of the present invention, an add-subtract ratio of the wobble of the second track to the wobble of the first track may be fixed at a constant value on the whole tracks. In this case, the add-subtract ratio may be in a range of −0.25 to 0.25.

The above object of the present invention can be achieved by an optical recording medium with tracks wobbled, according to the present invention. In the optical recording medium, the wobble of the track is formed in a shape of canceling the crosstalk from the second track and the third track adjacent to the first track at playback of the first track.

According to the present invention, since the crosstalk from the second track and the third track is canceled at playback of the first track, the accurate wobble signal can be obtained.

In one aspect of the present invention, an add-subtract ratio of the wobbles of the second track and the third track to the wobble of the first track may be fixed at a constant value on the whole tracks. In this case, the add-subtract ratio may be in a range of −0.25 to 0.25.

The above object of the present invention can be achieved by an information playback method, according to the present invention. The method is one for reproducing information in an information playback apparatus having a first detecting device for supplying a difference between respective output signals optically obtained by a pair of detectors for reading information of a first track of an optical recording medium and a second detecting device for supplying a difference between respective output signals optically obtained by a pair of detectors for reading information of a second track adjacent to the first track. The method is provided with: a first demodulating process for demodulating a detected signal supplied from the first detecting device; a second demodulating process for demodulating a detected signal supplied from the second detecting device; a crosstalk extracting process for extracting crosstalk caused by the second track, which is included in a demodulation signal obtained in the first demodulating process, from the same signal; a coefficient controlling process for controlling a coefficient based on the crosstalk extracted in the crosstalk extracting process; and a crosstalk canceling process for canceling the above crosstalk on the basis of the coefficient calculated in the coefficient controlling process.

According to the present invention, since the crosstalk caused by the second track, which is included in the demodulation signal, is extracted from the same signal, the coefficient is controlled based on the extracted crosstalk, and the crosstalk is canceled by the coefficient, the crosstalk can be canceled effectively, and the crosstalk, for example, also in the wobble signal can be eliminated.

The above object of the present invention can be achieved by an information playback method, according to the present invention. The method is one for reproducing information in an information playback apparatus having a first detecting device for supplying a difference between respective output signals optically obtained by a pair of detectors for reading information of a first track of an optical recording medium and a second detecting device and a third detecting device for respectively supplying a difference between output signals optically obtained by each pair of detectors for reading respective information of a second track and a third track on the both sides adjacent to the first track. The method is provided with: a first demodulating process for demodulating a detected signal supplied from the first detecting device; a second demodulating process for demodulating a detected signal supplied from the second detecting device; a third demodulating process for demodulating a detected signal supplied from the third detecting device; a crosstalk extracting process for extracting crosstalk caused by the second track and the third track, which is included in a demodulation signal obtained in the first demodulating process, from the same signal; a coefficient controlling process for controlling a coefficient based on the crosstalk extracted in the crosstalk extracting process; and a crosstalk canceling process for canceling the above crosstalk on the basis of the coefficient calculated in the coefficient controlling process.

According to the present invention, the crosstalk caused by the second track and the third track, which is included in the demodulation signal, is extracted from the same signal, the coefficient is controlled based on the extracted crosstalk, and the crosstalk is canceled by the coefficient, the crosstalk can be canceled effectively, and the crosstalk, for example, also in the wobble signal can be eliminated.

Although the present invention has been described with the reference numeral attached in a parenthesis in the accompanying drawings for easy understanding, it is not restricted to the form of the drawings.

DESCRIPTION OF THE PREFERRED EMBODIMENTS

Information Playback Apparatus

Hereinafter, an information playback apparatus in a preferred embodiment of the present invention will be described with reference to FIG. 2 to FIG. 18.

First, a basic structure of the information playback apparatus in the preferred embodiment will be described.

FIG. 3 is a view showing the basic structure of the information playback apparatus of the preferred embodiment. As a method of recording address information by phase modulation of wobble, a description will be made by way of an example in the case of using a method of wobbling tracks according to address information by such phase modulation that brings binary address information into correspondence with the phase of wobble (for example, 0° and 180°).

Figure 3A:
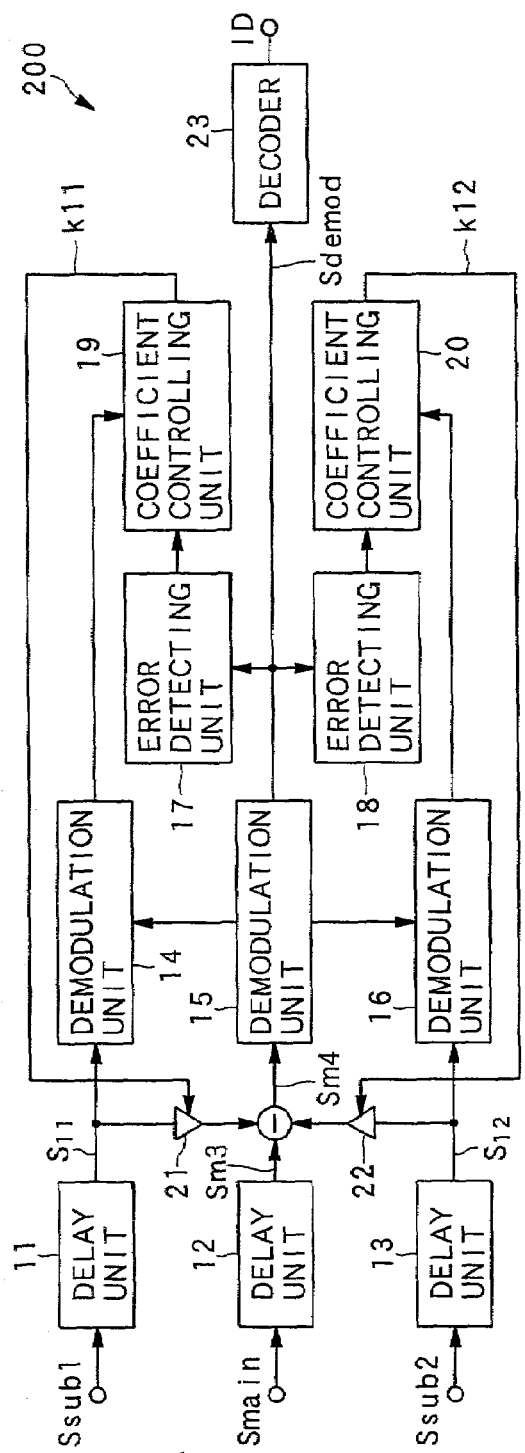
FIGS. 3A and 3B are views showing a basic structure of an information playback apparatus in preferred embodiments of the present invention.

The information playback apparatus shown in FIG. 3A is provided with: delay units 11, 12, and 13 for delaying detected signals Ssub1, Smain, and Ssub2 for a predetermined time; demodulation units 14, 15, and 16 for demodulating wobble signals recorded by phase modulation; error detecting units 17 and 18 for respectively detecting an error included in a demodulation signal Sdemod; and coefficient controlling units 19 and 20 for respectively controlling a crosstalk canceling coefficient according to the information of the error detecting units 17 and 18. The signals Ssub1, Smain, and Ssub2 are detected by three detectors for respectively reading out wobbles (address information) of three adjacent tracks formed on an optical disc. The error detecting units 17 and 18 may be formed in one shared detecting unit.

The delay units 11, 12, and 13 are used for canceling the relative positional relation of optical spots of the detectors for reading the wobbles of the three tracks. In the case of radiating three beams on mutually adjacent tracks, the optical spots are disposed in a direction of reading the track information (wobble), in other words, at each position deviated from each other in the circumferential direction of the optical disc. The delay units 11 to 13 adjust delays of the detected signals Ssub1, Smain, and Ssub2 so as to cancel the positional deviations of the optical spots in the circumferential direction of the optical disc. Thus, signals $S_{11}$, Sm3, and $S_{12}$ supplied from the delay units 11 to 13 correspond to the detected signals in the case of equally aligning three optical spots in a radius direction of the optical disc.

The error detecting unit 17 detects an error $\Delta S$ between an ideal address demodulation signal and the address demodulation signal Sdemod actually supplied from the demodulation unit 15 and supplies it to the coefficient controlling units 19. The coefficient controlling unit 19 detects correlation between the error $\Delta S$ and the signal $S_{11}$ and supplies a coefficient k11 corresponding to the correlation, to a multiplier 21, where the coefficient k11 is multiplied by the signal $S_{11}$. On the other hand, the coefficient controlling unit 20 detects correlation between the error $\Delta S$ and the signal $S_{12}$ and supplies a coefficient k12 corresponding to the correlation, to a multiplier 22, where the coefficient k12 is multiplied by the signal $S_{12}$.

As illustrated in FIG. 3A, the output values of the multiplier 21 and the multiplier 22 are subtracted from the signal Sm3 supplied from the delay unit 12, hence to get a signal Sm4. Further, the signal Sm4 is demodulated by the demodulation unit 15 and the address demodulation signal Sdemod is supplied.

According to a feedback control by the above two loops, the coefficients of the multipliers 21 and 22 are controlled so as to get the minimum ΔS, in other words, so as to get the minimum crosstalk from the both adjacent tracks in the address demodulation signal Sdemod. Thus, the crosstalk from the both adjacent tracks in the address demodulation signal Sdemod is canceled.

The address demodulation signal Sdemod having the crosstalk canceled is entered to the demodulator 23, hence to reproduce the address information.

In this way, in the structure of FIG. 3A, the crosstalk with respect to the detected signal before demodulation is canceled, and the address demodulation signal is obtained by demodulating the detected signal after cancellation of the crosstalk.

Figure 3B:
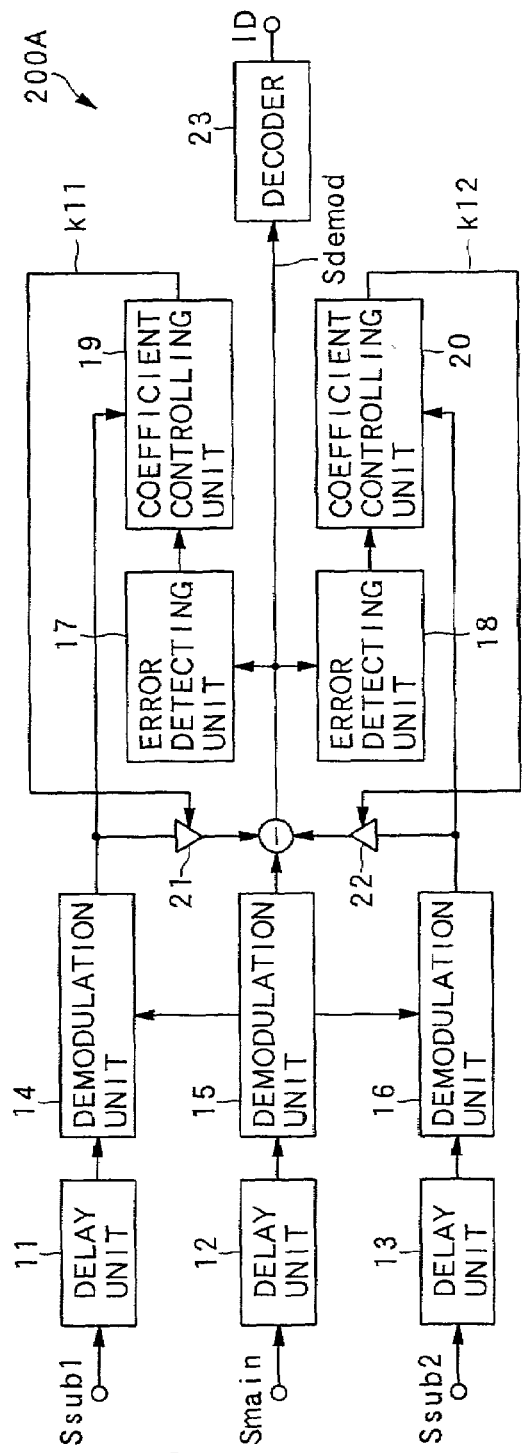

On the contrary, the structure shown in FIG. 3B indicates the case of canceling the crosstalk with respect to the demodulated detected signal. The same reference numeral is respectively attached to the same element as shown in FIG. 3A.

As illustrated in FIG. 3B, in this structure, the crosstalk is canceled by subtracting demodulated signals, which are output signals of the demodulation unit 14 and the demodulation unit 16, from the demodulated signal, which is the output signal of the demodulation unit 15. Also in this structure, according to a feedback control by the two loops concerned with the multiplier 21 and the multiplier 22, the coefficients of the multipliers 21 and 22 are controlled so as to get the minimum correlation that is calculated by the coefficient controlling units 19 and 20, namely, so as to get the minimum crosstalk from the both adjacent tracks in the address demodulation signal Sdemod. Thus, the crosstalk from the both adjacent tracks in the address demodulation signal Sdemod is canceled. The functions of the delay units 11 to 13 are the same in the case of the structure shown in FIG. 3A.

Figure 2A:
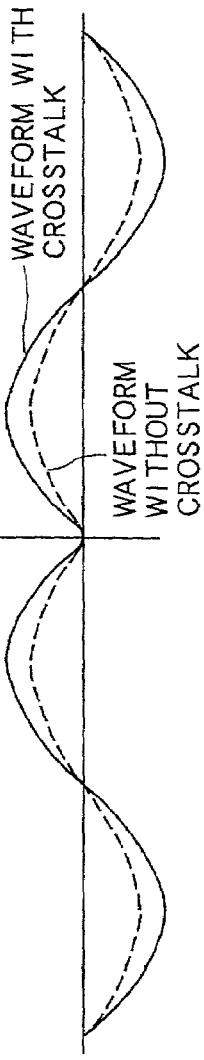
FIG. 2A is a view showing a waveform of a wobble signal before demodulation including no crosstalk and no noise.
Figure 2B:
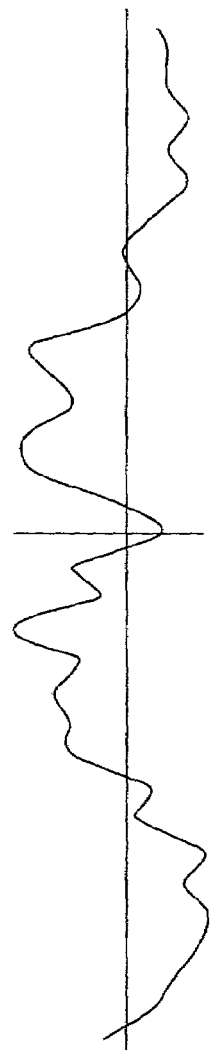
FIG. 2B is a view showing a waveform of a wobble signal before demodulation including crosstalk and noise.
Figure 2C:
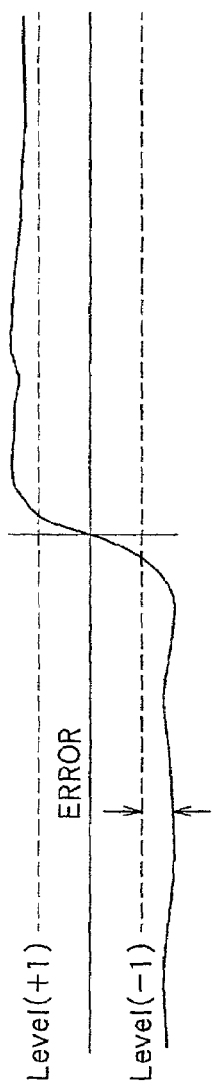
FIG. 2C is a view showing a waveform of an address signal after demodulation in the case of demodulating a wobble signal including crosstalk and noise.

FIG. 2C shows an address signal waveform which have been demodulated in the apparatuses of FIG. 3A and FIG. 3B, in the case of demodulating a wobble signal including crosstalk and noise. The demodulated address signal waveform must be a signal waveform having digital levels (Level (+1) and Level (−1)) in the ideal case where no crosstalk exits. Therefore, it is possible to detect an error (crosstalk) as for the demodulated signal waveform as shown in FIG. 2C, by detecting the deviated amount from the above-mentioned ideal signal waveform. It has the advantage of decreasing influence of noise because of passing a signal through a low-pass filter under the process of demodulation. In other words, it is possible to control the crosstalk canceling coefficient of a wobble signal.

Figure 4:
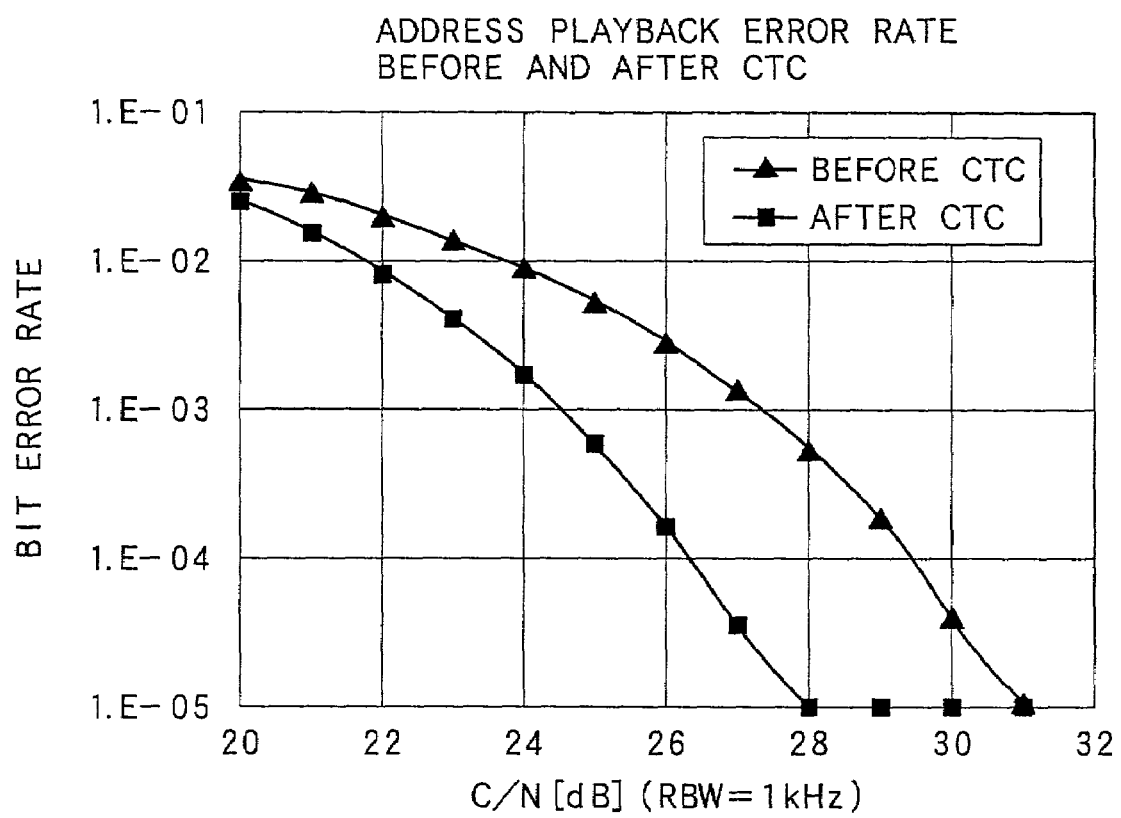
FIG. 4 is a view showing a change of error rate before and after crosstalk cancellation.

FIG. 4 shows the result of simulating error rate in address playback in the structure of FIG. 3B. The condition of the simulation is NA=0.6, wavelength λ=650 nm, and track pitch=680 nm.

FIG. 4 shows the bit error rate before and after canceling the crosstalk. The horizontal axis shows the C/N (carrier/noise) ratio and the resolution bandwidth is 1 kHz.

As illustrated in FIG. 4, in the case of canceling the crosstalk, the bit error rate is extremely decreased compared with the case of not canceling the crosstalk. Especially, it is remarkably effective in the area of high C/N ratio.

Therefore, a coefficient control based on the demodulated signal is able to cancel the crosstalk favorably and read the address information accurately.

FIG. 5 and FIG. 6 show the simulation result of eye patterns of a demodulated address signal in the case of FIG. 4.

Figure 5A:
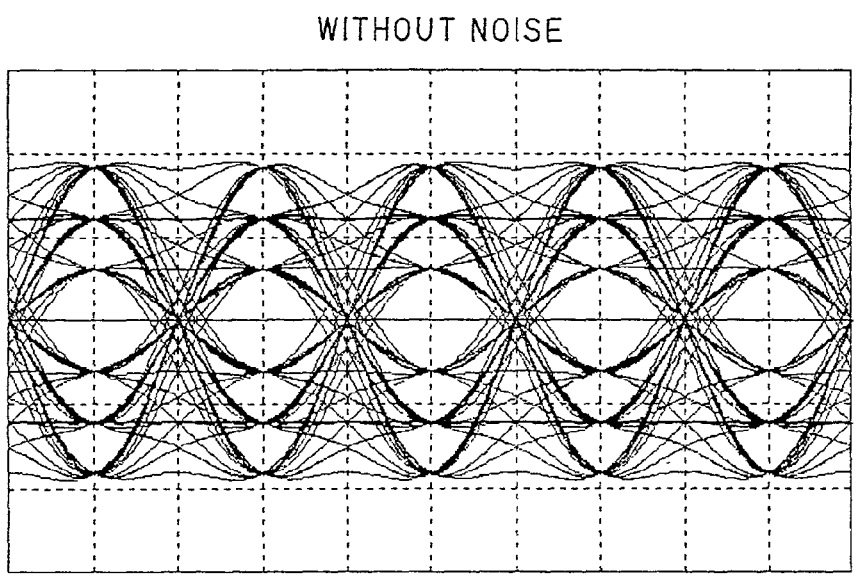
FIG. 5A is a view showing eye patterns before crosstalk cancellation.
Figure 5B:
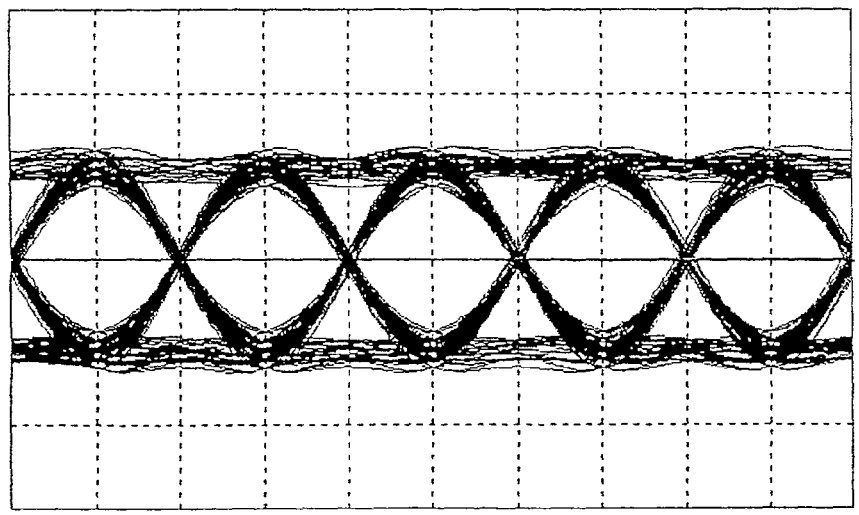
FIG. 5B is a view showing eye patterns after crosstalk cancellation.

FIG. 5 shows the case of having no noise; FIG. 5A shows the eye patterns before crosstalk cancellation, and FIG. 5B shows the eye patterns after the crosstalk cancellation. As apparent from the comparison with FIG. 5A and FIG. 5B, according to the crosstalk cancellation performing the coefficient control based on the demodulated signal, the track of the eye patterns is significantly approaching to the waveform of the correct address playback signal. Namely, in FIG. 5A, the levels of the demodulation signals are not constant, while, in FIG. 5B the demodulation signals converge to constant levels.

Figure 6A:
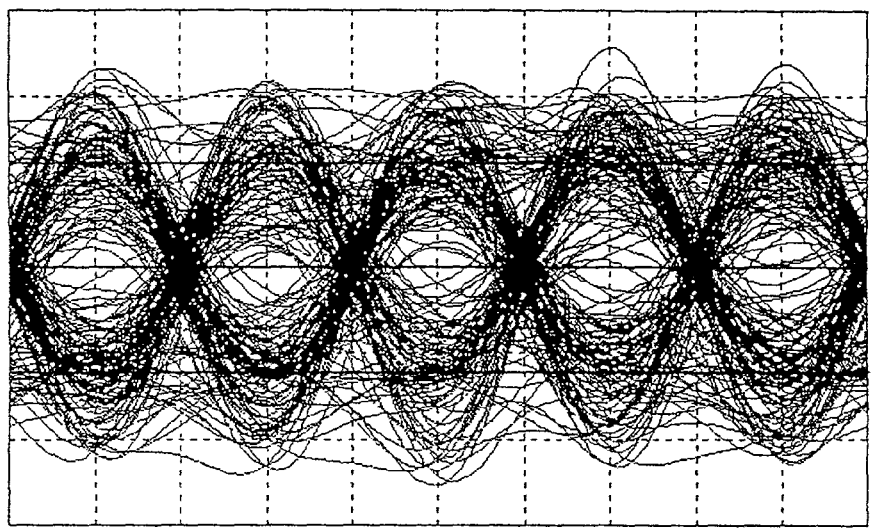
FIG. 6A is a view showing a simulation result of eye patterns before crosstalk cancellation.
Figure 6B:
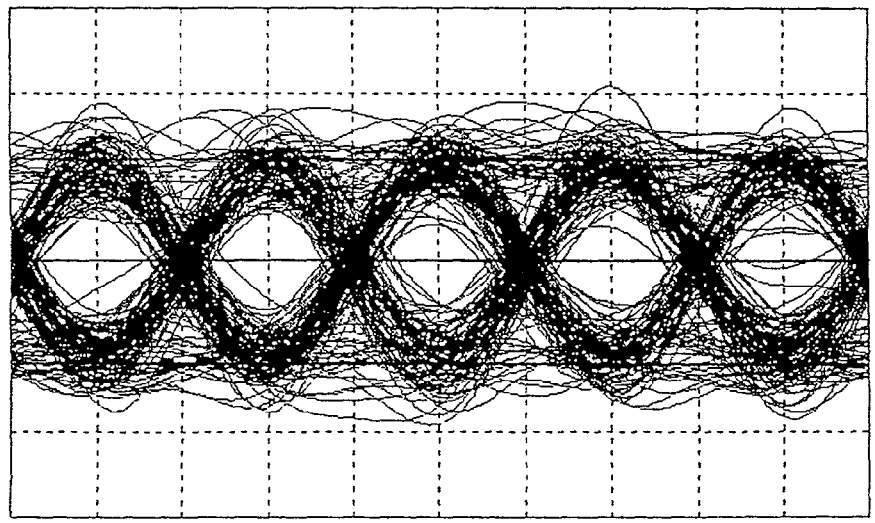
FIG. 6B is a view showing a simulation result of eye patterns after crosstalk cancellation.

FIG. 6 shows the case of having noise (the case of C/N=30 dB); FIG. 6A shows the eye patterns before the crosstalk cancellation, and FIG. 6B shows the eye patterns after the crosstalk cancellation. Also in this case, the track of the eye patterns in FIG. 6B further approaches to the waveform of the original address playback signal, compared with the case of FIG. 6A. Namely, in FIG. 6A, there are some portions where the two values (+1 and −1) may be judged to inverted, while, in FIG. 6B, there is no such a portion. The waveform of FIG. 6B corresponds to the waveform generated by overlapping a noise component with the waveform of FIG. 5B.

COMPARATIVE EXAMPLE

A comparative example will be described with respect to FIGS. 1, 2A, 2B and 2C.

Figure 1:
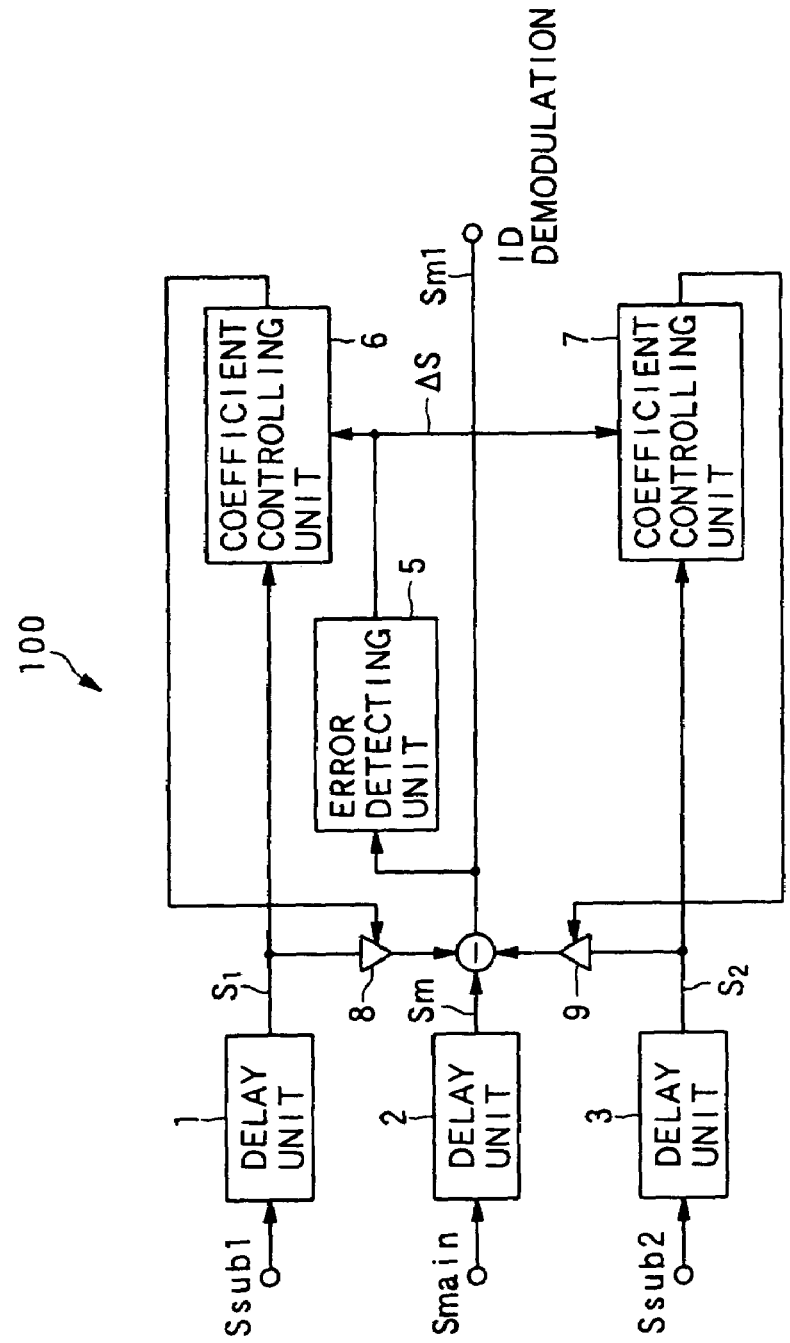
FIG. 1 is a view showing an example of applying a conventional apparatus for eliminating crosstalk of RF signals from adjacent tracks, to a wobble signal.

In FIG. 1, a conventional apparatus for eliminating crosstalk of an RF signal from an adjacent track is simply applied to a wobble signal. The apparatus shown in FIG. 1 is provided with: three delay units 1, 2, and 3 for delaying detected signals Ssub1, Smain, and Ssub2 for a predetermined time; an error detecting unit 5 for detecting an error of a signal Sm; and coefficient controlling units 6 and 7 for controlling a crosstalk canceling coefficient according to the information of the error detecting unit 5.

The error detecting unit 5 detects an error ΔS between an ideal signal Sm1 included in the actually-supplied signal and supplies it to the coefficient controlling units. The coefficient controlling unit 6 detects correlation between the error ΔS and the signal $S_1$ and supplies the coefficient k1 corresponding to the correlation, to a multiplier 8, where the coefficient k1 is multiplied by the signal $S_1$. While, the coefficient controlling unit 7 detects correlation between the error ΔS and the signal $S_2$ and supplies the coefficient k2 corresponding to the correlation, to a multiplier 9, where the coefficient K2 is multiplied by the signal $S_2$.

As illustrated in FIG. 1, the output values of the multipliers 8 and 9 are subtracted from the signal Sm supplied from the delay unit 2, hence to generate a signal Sm1.

According to a feedback control by the above two loops, the coefficients of the multipliers 8 and 9 are controlled so as to get the minimum correlation that is calculated by the coefficient controlling units 6 and 7, in other words, so as to get the minimum crosstalk from the both adjacent tracks in the signal Sm1. Thus, the crosstalk from the both adjacent tracks in the signal Sm is canceled. The signal Sm1 supplied from the apparatus 100 is thereafter demodulated in a predetermined way so to get the address information.

In this structure of FIG. 1, an error is extracted from a detected signal before demodulation, cancellation of crosstalk is carried out on the detected signal before demodulation according to the coefficient control, and the detected signal having the crosstalk canceled is demodulated, thereby getting an address demodulation signal.

FIG. 2A shows a wobble signal waveform which does not include crosstalk nor noise, and FIG. 2B shows a wobble signal waveform which includes crosstalk and noise in the apparatus of above-described FIG. 1.

When recording the address data by phase modulation of wobble, the wobble signal waveform becomes a sine wave like FIG. 2A. This is why a carrier signal, which carries address data is recorded by wobbling the group in an analog way. Generally, it is difficult to detect an error (crosstalk amount) from this analog signal waveform. A signal before actual demodulation has a random noise and it becomes very noisy as illustrated in FIG. 2B. Therefore, it is practically impossible to detect an error.

Another Embodiment

Figure 7:
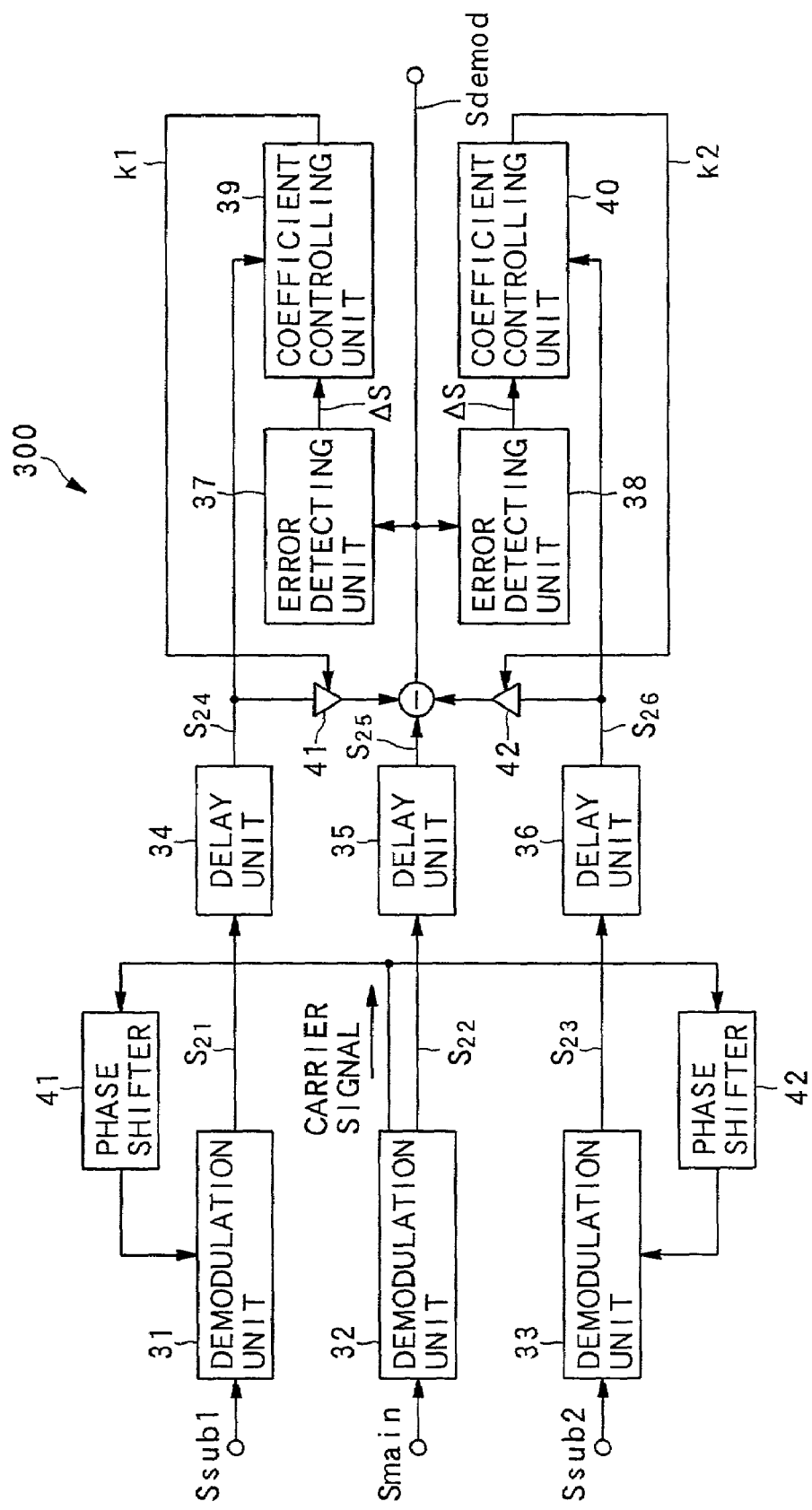
FIG. 7 is a view showing another basic structure of an information playback apparatus in preferred embodiments of the present invention.

FIG. 7 is a view showing another basic structure of the information playback apparatus according to the present invention. The apparatus shown in FIG. 7 corresponds to an optical disc in which tracks are wobbled according to address information by modulating the phase of wobble, similarly to the apparatus shown in FIG. 3.

As illustrated in FIG. 7, the information playback apparatus 300 is provided with: demodulation units 31, 32, and 33 for respectively demodulating the detected signals Ssub1, Smain, and Ssub2 from three detectors for respectively reading wobbles (address information) of three tracks adjacent to each other formed on an optical disc; delay units 34, 35, and 36 for delaying the signals $S_{21}$, $S_{22}$, and $S_{23}$, supplied from the demodulation units 31, 32, and 33 respectively, for a predetermined time; error detecting units 37 and 38 for respectively detecting an error included in the demodulation signal Sdemod; and coefficient controlling units 39 and 40 for respectively controlling a crosstalk canceling coefficient according to the information of the error detecting units 37 and 38.

As illustrated in FIG. 7, a carrier signal is supplied to the demodulation unit 31 through a phase shifter 41. A carrier signal is also supplied to the demodulation unit 33 through a phase shifter 42.

As illustrated in FIG. 7, the detected signals Ssub1, Smain, and Ssub2 from the detectors are respectively supplied to the demodulation units 31, 32, and 33, without adjustment of each delay. Therefore, the information playback apparatus shown in FIG. 7 is designed so that it can change the phases of carrier signals given to the demodulation units 31, 32, and 33, in accordance with the various phases of the detected signals Ssub1, Smain, and Ssub2 depending on the positions of optical spots of the respective detectors. The delay units 34, 35, and 36 cancel the relative positional relation of the optical spots of the detectors. This structure can decrease an error of an optical spot, and when an error is small enough to be neglected as a demodulated address signal, the delay units 34, 35, and 36 can be omitted.

The error detecting unit 37 detects an error ΔS between an ideal address demodulation signal Sdemod and the address demodulation signal Sdemod actually supplied and supplies it to the coefficient controlling unit 39. The coefficient controlling unit 39 detects correlation between the error ΔS and the output signal $S_{24}$ of the delay unit 34 and supplies the coefficient k1 corresponding to the correlation, to a multiplier 41, where the coefficient k1 is multiplied by the output signal $S_{24}$ of the delay unit 34.

The error detecting unit 38 detects an error ΔS between an ideal address demodulation signal and the address demodulation signal Sdemod actually supplied and supplies it to the coefficient controlling unit 40. The error detecting unit 37 and the error detecting unit 38 are completely identical, and generally they are used in common. The coefficient controlling unit 40 detects correlation between the error ΔS and the output signal $S_{26}$ of the delay unit 36 and supplies the coefficient k2 corresponding to the correlation, to a multiplier 42, where the coefficient k2 is multiplied by the output signal $S_{26}$ of the delay unit 36.

As illustrated in FIG. 7, the output values of the multiplier 41 and the multiplier 42 are subtracted from the signal $S_{25}$ supplied from the delay unit 35, thereby generating the address demodulation signal Sdemod.

According to a feedback control by the above two loops, the coefficients of the multiplier 41 and the multiplier 42 are controlled so as to get the minimum correlation that is calculated by the coefficient controlling units 39 and 40, in other words, so as to get the minimum crosstalk from the both adjacent tracks in the address demodulation signal Sdemod. Thus, the crosstalk from the both adjacent tracks in the address demodulation signal Sdemod is canceled.

The address demodulation signal Sdemod in which the crosstalk is canceled is supplied to a demodulator (not illustrated), thereby generating the address information.

As mentioned above, the information playback apparatus of the present invention includes a device for canceling crosstalk in a stage before demodulation and a device for canceling crosstalk in a stage after demodulation as a method of canceling crosstalk. Though in the above structure, the case of canceling the crosstalk from the both adjacent tracks has been described, the crosstalk from only one track of the adjacent tracks may be canceled, for example, when an optical spot is deviated from a central line of a main track toward one side.

The order of the delay unit and the demodulation unit is not restrictive in the present invention. As a method of recording address information of an optical disc by wobbles, a method of recording wobbles phase-modulated depending on the address information has been proposed, in addition to a method of recording the FM-modulated wobbles. The information playback apparatus of the present invention, however, can be applied to any recording method of address information. The information to be recorded by wobbles is not restricted to the address information.

The demodulation unit, the error detecting unit, the coefficient controlling unit, and the multiplier may be integrated into an integrated circuit (IC).

The operation of the error detecting unit in the above structure will be described in the following embodiment.

In the following embodiment, a description will be made in the case of applying the present invention to an information playback apparatus for reading the information of an optical disc (especially, wobble or address information) adopting a method of recording address information by phase modulation of wobbles.

Other Embodiments

Hereinafter, other embodiments of the information playback apparatus according to the present invention will be described with reference to FIG. 8 to FIG. 18.

Figure 8:
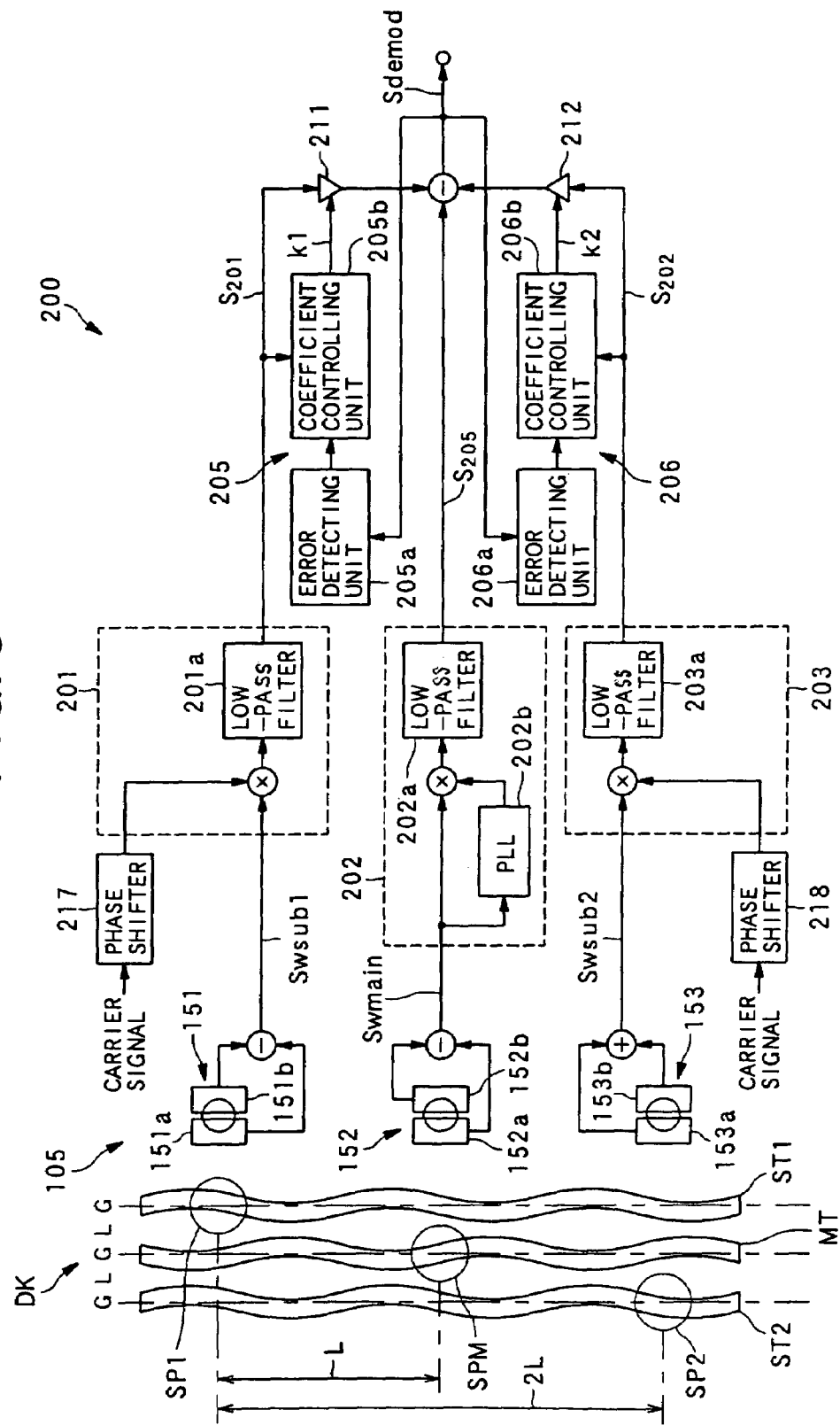
FIG. 8 is a circuit block diagram showing an information playback apparatus in preferred embodiments.
Figure 9:
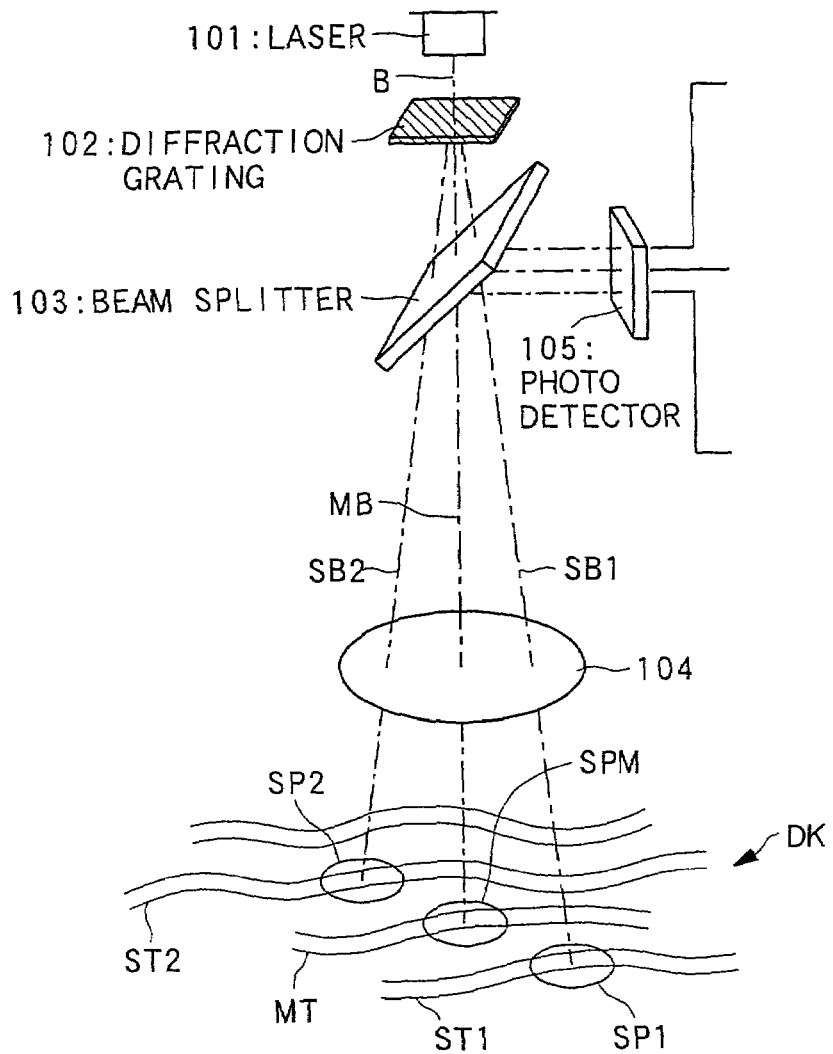
FIG. 9 is a view showing a structure of an optical system for reading the information recorded in an optical disc in preferred embodiments.
Figure 10:
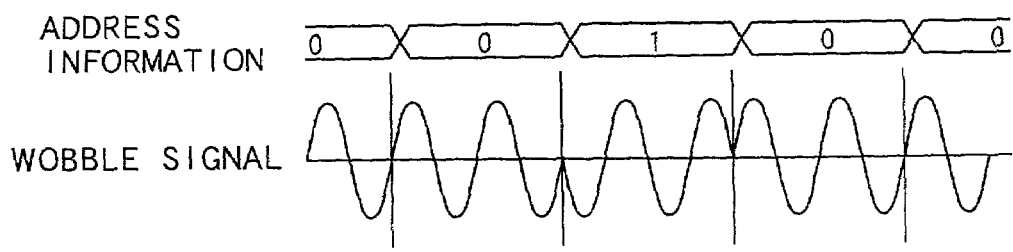
FIG. 10 is a view showing a recording method of address information in preferred embodiments.

FIG. 8 is a circuit view showing the structure of the information playback apparatus according to the embodiment, FIG. 9 is a view showing a structure of an optical system for reading the information recorded in an optical disc, and FIG. 10 is a view showing a recording method of address information.

At first, a recording method of address information in an optical disc DK from which the information playback apparatus 200 reads information will be described.

As illustrated in FIG. 10, the address information of an optical disc DK is recorded into every group by using binary data, 0 and 1. As illustrated in FIG. 8 and FIG. 9, the groups are wobbled in a shape of a periodic sine wave, and the data 0 and 1 forming the address information are recorded as wobbles of one cycle having 0° and 180° phase respectively. The frequency of the wobble is positioned between the tracking servo bandwidth and the RF signal bandwidth.

Next, the information playback apparatus 200 will be described.

As illustrated in FIG. 8 and FIG. 9, the information playback apparatus 200 is provided with: a laser 101; a diffraction grating 102; a beam splitter 103; an objective lens 104; a photo detector 105; a demodulation unit 201 including a low-pass filter 201a; a demodulation unit 202 including a low-pass filter 202a and an PLL circuit 202b; a demodulation unit 203 including a low-pass filter 203a; coefficient controlling units 205 and 206; and amplifiers 211 and 212.

Hereinafter, the details and operation of each unit will be described.

The laser 101 generates an optical beam B for reproducing information having a predetermined strength, and radiates it to the diffraction grating 102. The diffraction grating 102 divides the optical beam B into a main beam MB to be radiated on a main track MT where the information to be reproduced is recorded and sub beams SB1 and SB2 to be radiated on sub tracks ST1 and ST2 formed on the both sides adjacent to the main track, and the respective beams are radiated to the beam splitter 103.

The divided main beam MB and sub beams SB1 and SB2 pass through the beam splitter 103 and is radiated to the objective lens 104.

Thus, the objective lens 104 focuses the main beam MB, the sub beam SB1, and the sub beam SB2, respectively on the main track MT, the sub track ST1, and the sub track ST2. At this time, an optical spot SPM by the main beam MB is formed at a radiation position on the main track MT, an optical spot SP1 by the sub beam SB1 is formed at a radiation position on the sub track ST1, and an optical spot SP2 by the sub beam SB2 is formed at a radiation position on the sub track ST2. As illustrated in FIG. 8, the optical spot SPM, the optical spot SP1, and the optical spot SP2 are arranged in a direction inclined to a radius of the optical disc DK and they are placed at positions respectively deviated in the circumferential direction of the optical disc DK (reading direction of information).

The reflected lights of the main beam MB, the sub beam SB1, and the sub beam SB2 from the optical disc DK are converged on the beam splitter 103 through an inverse course of the original main beam MB and sub beams SB1 and SB2. Here, the polarization surfaces of the reflected lights of the main beam MB, sub beam SB1, and sub beam SB2 from the optical disc DK are rotated at a little angle, by the reflection of the optical disc DK.

Thus, the beam splitter 103 reflects the reflected lights whose polarization surfaces are rotated and separately radiates the respective reflected lights on the photo detector 105.

As illustrated in FIG. 8, the photo detector 105 has detectors 151, 152, and 153 for respectively receiving the three reflected lights and supplying push-pull signals. The respective detectors 151, 152, and 153 includes sensors 151a and 151b, sensors 152a and 152b, and sensors 153a and 153b respectively as a pair. The respective detectors 151, 152, and 153 generate three detected signals (push-pull signals) Swsub1, Swmain, and Swsub2 obtained as a difference between the detected signals of the respective sensors (for example, 152a and 152b).

Here, the detected signal Swmain corresponds to the reflected light of the main beam MB, the detected signal Swsub1 corresponds to the reflected light of the sub beam SB1, and the detected signal Swsub2 corresponds to the reflected light of the sub beam SB2.

The detected signal (push-pull signal) Swsub1 is supplied to the demodulation unit 201, the detected signal (push-pull signal) Swmain is supplied to the demodulation unit 202, and the detected signal (push-pull signal) Swsub2 is supplied to the demodulation unit 203.

Figure 11A:
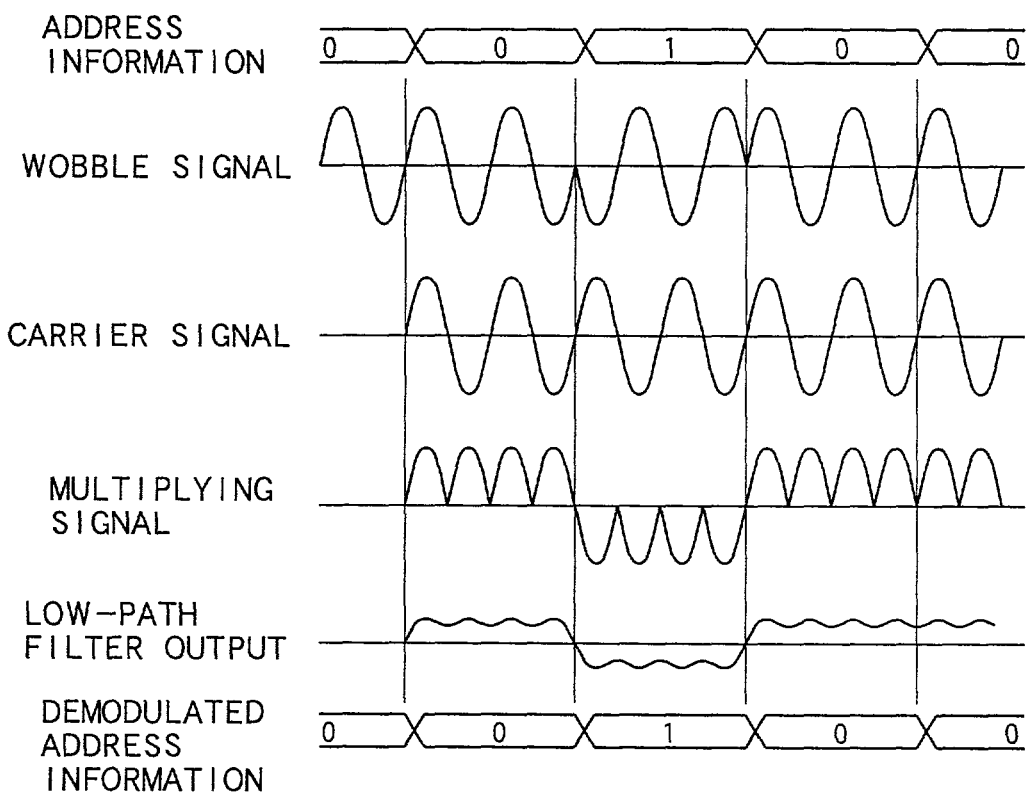
FIG. 11A is a view showing the relationship among a wobble signal, a carrier signal, and a multiplying signal.

Next, the operation of the demodulation units 201 to 203 will be described. FIG. 11 is a view showing the demodulation method in the respective demodulation units 201 to 203. FIG. 11A is a view showing the relationship among a wobble signal, a carrier signal, and a multiplying signal, and FIG. 11B is a view showing a circuit example used in demodulation.

As illustrated in FIG. 11A, in the optical disc DK, the binary address information is recorded by two types of phase modulation; 0° and 180° of wobble signal (sine wave). After multiplying the carrier signal (sine wave of the phase 0° in FIG. 11A) by the wobble signal shown in FIG. 11A, a demodulation signal indicating the output values (binary) depending on the phase of the wobble signal can be obtained by passing the multiplying signal obtained by the multiplication through the low-pass filters (the low-pass filters 201a, 202a, and 203a).

Figure 11B:
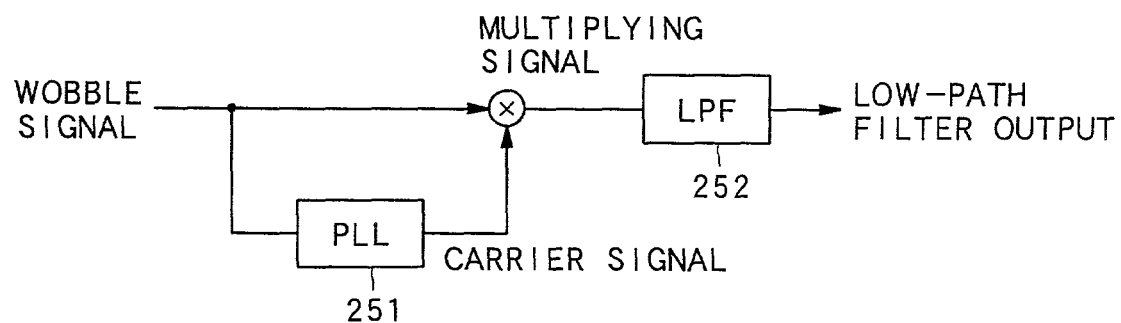
FIG. 11B is a view showing a circuit example used in demodulation.

As illustrated in FIG. 11B, the carrier signal can be generated by entering the wobble signal into the PLL circuit 251. The carrier signal is multiplied by the wobble signal, thereby generating a multiplying signal, and further the multiplying signal is supplied to a low-pass filter 252, thereby obtaining a low-pass filter output.

As illustrated in FIG. 8, in the demodulation unit 202, the detected signal Swmain is demodulated by using the carrier signal obtained by supplying the detected signal (push-pull signal) Swmain of the detector 152 to the PLL circuit 202b. As mentioned in the first embodiment, since the optical spots SP1, SPM, and SP2 radiated on the sub track ST1, the main track MT, and the sub track ST2 are respectively deviated in a direction of reading information, a use of the same carrier signal in all the demodulation units 201 to 203 could not cope with the phases of the detected signals read from the respective tracks. Therefore, the carrier signal generated by the PLL circuit 202b is not supplied directly to the demodulation units 201 and 203, but supplied to the demodulation unit 201 through the phase shifter 217 and to the demodulation unit 203 through the phase shifter 218. This phase shift of the carrier signal makes it possible to adjust the phase of the carrier signal entered into the demodulation units 201 and 203 to the phase of the detected signal.

In the coefficient controlling unit 205, the controlling coefficient k1 is supplied to the multiplier 211 based on the push-pull demodulation signal $S_{201}$ supplied from the low-pass filter 201a of the demodulation unit 201 and the address demodulation signal Sdemod supplied at last.

In the coefficient controlling unit 206, the controlling coefficient k2 is supplied to the multiplier 212 based on a comparison between the push-pull demodulation signal $S_{202}$ supplied from the low-pass filter 203a of the demodulation unit 203 and the address demodulation signal Sdemod supplied at last.

The output values of the multipliers 211 and 212 are subtracted from the push-pull demodulation signal $S_{205}$ supplied from the low-pass filter 202a of the demodulation unit 202, thereby canceling the crosstalk depending on the respective coefficients k1 and k2 and generating the address demodulation signal Sdemod.

In the circuit of FIG. 8, a loop circuit formed by the coefficient controlling unit 205 and the multiplier 211 performs a feedback control for defining the coefficient k1 so as to minimize the crosstalk of the push-pull signal of the sub track ST1 included in the address demodulation signal Sdemod. A loop circuit formed by the coefficient controlling unit 206 and the multiplier 212 performs a feedback control for defining the coefficient k2 so as to minimize the crosstalk of the push-pull signal of the sub track ST2 included in the address demodulation signal Sdemod.

A control method of coefficient performed by the coefficient controlling unit will be described with reference to FIGS. 12 to 18. Although the coefficient control method will be described, for convenience sake, various methods described below can be applied not only to this embodiment but also to the basic structure shown in FIG. 3 and FIG. 7.

Figure 12:
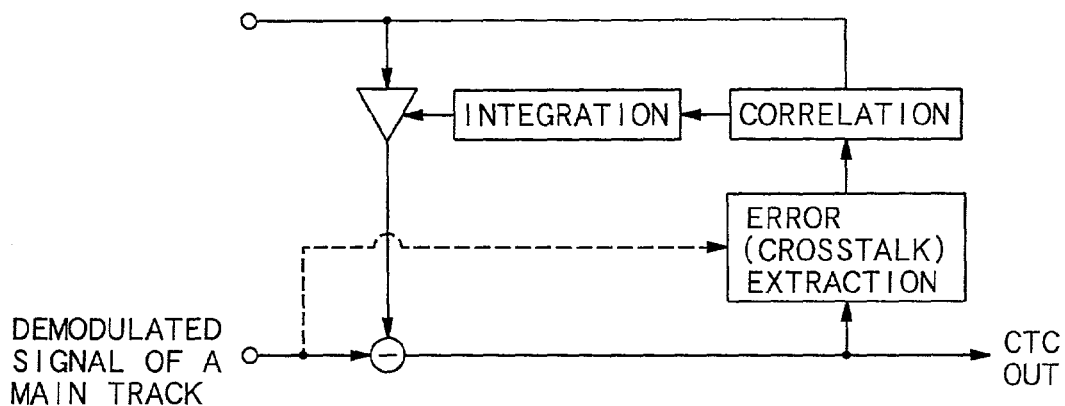
FIG. 12 is a conceptual view showing an example of a method for controlling an adopted coefficient in preferred embodiments.

FIG. 12 is a conceptual view showing one example of a method of controlling an adopted coefficient.

In the example shown in FIG. 12, an error (crosstalk) of the demodulated address signal of the main track after the crosstalk cancellation is detected, and a correlation between the error and the demodulated signal of the track (sub track) adjacent to the main track is examined. The signal of the adjacent tack is subtracted from the signal of the main track by the intensity depending on the coefficient determined by integrating the correlation value. According to this processing, when there is no correlation, in other words, when the crosstalk of the signal of the main track is completely canceled, the coefficient becomes stable as it is.

Next, method of detecting the error will be described.

Figure 13:
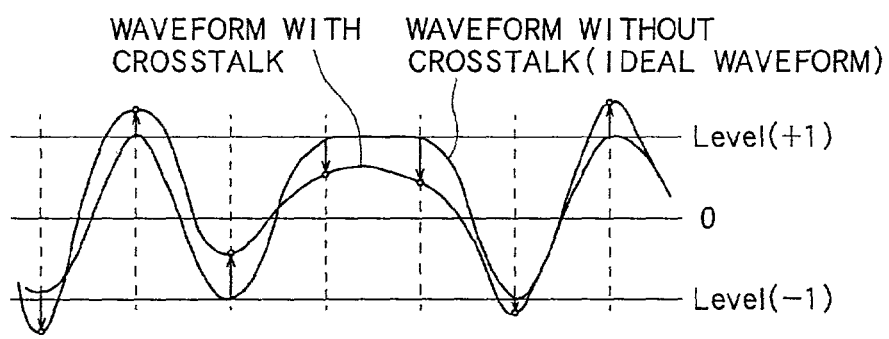
FIG. 13 is a view showing the waveform after demodulation of a main track and an ideal waveform including no crosstalk in preferred embodiments.
Figure 14:
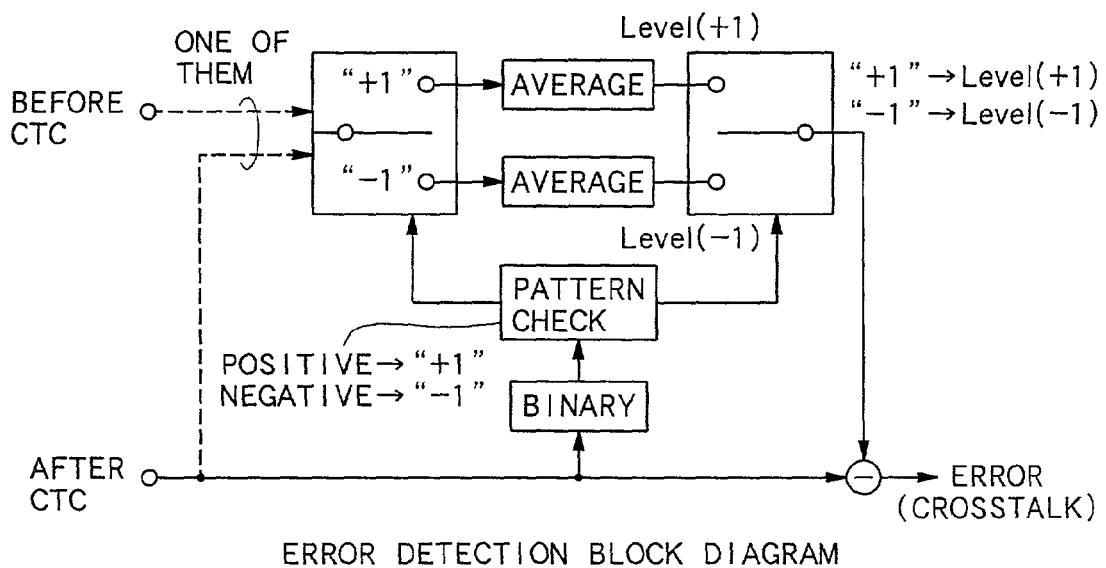
FIG. 14 is a conceptual view showing a block diagram for detecting an error in preferred embodiments.

As a method of detecting an error, there are methods shown in FIG. 13 and FIG. 14.

FIG. 13 is a view showing an ideal waveform including no crosstalk and a waveform after demodulation of the main track, and FIG. 14 is a schematic view showing a block diagram for detecting an error.

In this method, the value of the demodulated signal of the main track after the crosstalk cancellation is compared with reference levels (binary values of Level (+) and Level (−1)). Which reference level of the binary values to use is determined by converting the demodulated signal level of the main track to binary code (+1 and −1) and checking the data; if the check data is "+1", it may be compared with Level (+1), and if the check data is "−1", it may be compared with Level (−1). For example, the reference levels, Level (+1) and Level (−1) may be determined by averaging the demodulated signal level of the main track before the crosstalk cancellation for every check level ("+1" and "−1").

Alternatively, it may be determined by averaging the demodulated signal level of the main track after the crosstalk cancellation for every check level ("+" and "−1").

Figure 15:
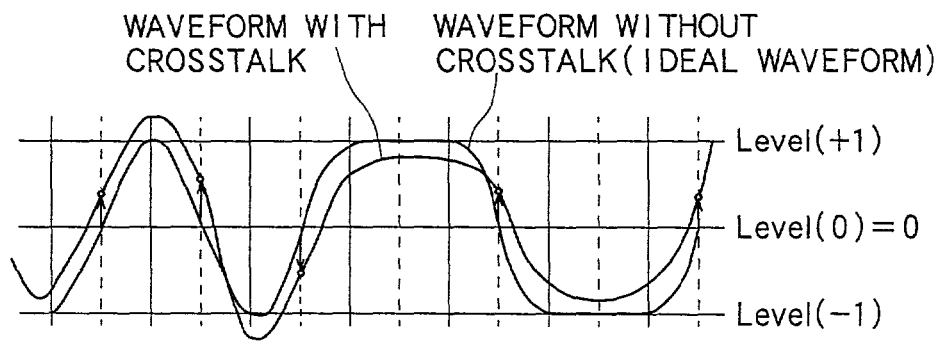
FIG. 15 is a view showing the waveform after demodulation of a main track and an ideal waveform including no crosstalk in preferred embodiments.
Figure 16:
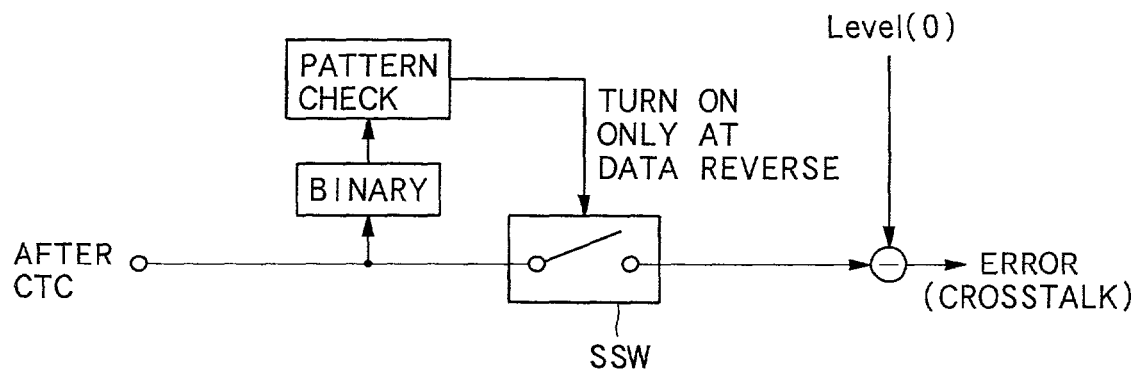
FIG. 16 is a conceptual view showing a block diagram for detecting an error in preferred embodiments.

FIG. 15 and FIG. 16 show the case of using a level at a zero cross point as a method of detecting an error. FIG. 15 is a view showing a waveform after demodulation of the main track and an ideal waveform including no crosstalk, and FIG. 16 is a conceptual view showing a block diagram for detecting an error.

As illustrated in FIG. 15 and FIG. 16, this error detecting method adopts a signal level at a zero cross point in the demodulated signal of the main track after the crosstalk cancellation.

In this case, since the reference level is always Level (0), it is not necessary to switch reference levels and it has the advantage of ensuring an error detection without being influenced by the amplitude of a signal. At a zero cross point, however, it is necessary to sample a signal at a timing when the demodulated signal of the main track should be zero, and therefore, a sampling switch ssw becomes necessary. For example, as illustrated in FIG. 16, sampling at a zero cross point is enabled by turning on the sampling switch ssw in accordance with a timing of switching data when converting the demodulated signal level of the main track after the crosstalk cancellation to binary code.

In this method, the sampling value at a zero cross point is compared with the reference level, Level (0), and as illustrated in FIG. 12, the above difference is integrated to be averaged in time, hence to determine the coefficient.

Figure 17:
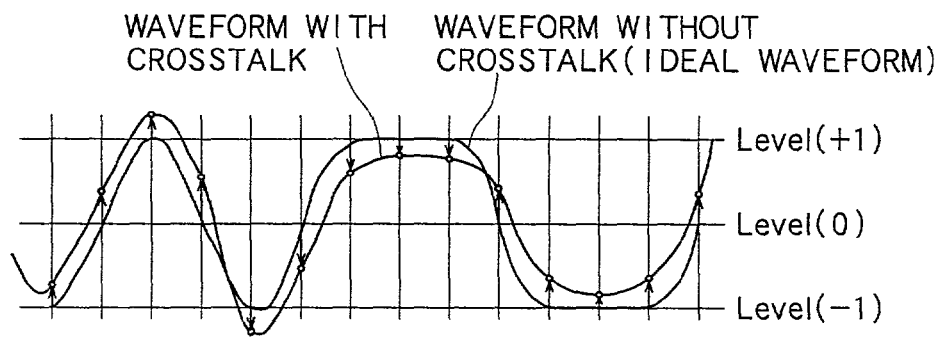
FIG. 17 is a view showing the waveform after demodulation of a main track and an ideal waveform including no crosstalk in preferred embodiments.
Figure 18:
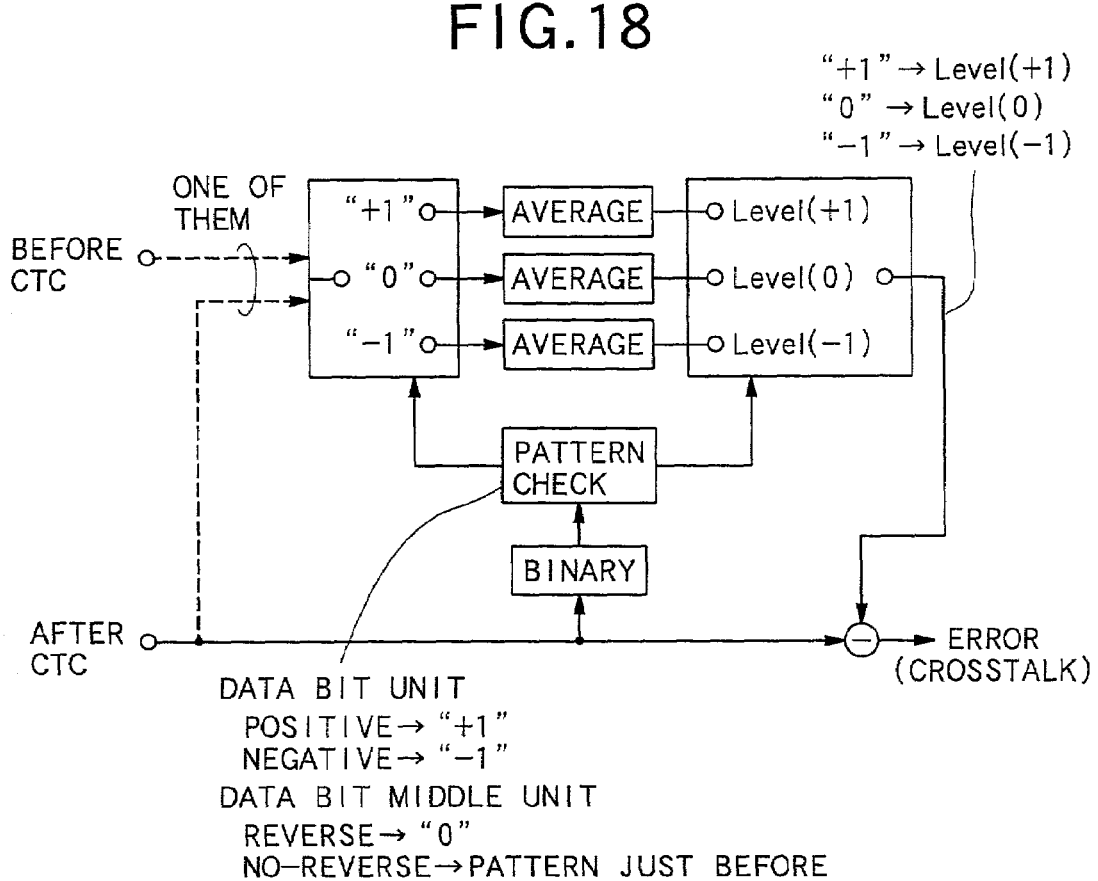
FIG. 18 is a conceptual view showing a block diagram for detecting an error in preferred embodiments.

The method shown in FIG. 17 and FIG. 18 is to compare the value of the demodulated signal of the main track after the crosstalk cancellation and the value at a zero cross point respectively with the reference levels (three values of Level (+1), Level (−1), and Level (0)), as a method of detecting an error. FIG. 17 is a view showing a waveform after demodulation of the main track and an ideal waveform including no crosstalk, and FIG. 18 is a conceptual view showing a block diagram for detecting an error.

This method is caused by combining the method shown in FIG. 13 and FIG. 14 with the method shown in FIG. 15 and FIG. 16. Which reference level of the three to use can be determined by the same way as shown in FIG. 13 and FIG. 14. Further, check at a zero cross point can be performed by the same way as shown in FIG. 15 and FIG. 16.

The reference level can be determined by averaging the demodulated signal level of the main track after the crosstalk cancellation for every check level ("+1", "0", and "−1"). Alternatively, it may be determined by averaging the demodulated signal level of the main track after the crosstalk cancellation for every check level ("+1", "0", and "−1").

Since an error of the demodulated signal of the main track after the crosstalk cancellation is extracted with respect to three values (+1, −1, and 0) in this method, the number of samples for error detection is increased, thereby having the advantage of decreasing influence of noise on the coefficient control.

Optical Recording Medium

Hereinafter, an embodiment of an optical recording medium according to the present invention will be described by using FIG. 19 and FIG. 20.

In the information playback apparatus of the present invention, crosstalk from the adjacent tracks is canceled at playback of wobbles. On the contrary, in the optical recording medium of the present invention, crosstalk at playback of wobbles is predicted and the predicted crosstalk is canceled at recording of wobbles.

Figure 19:
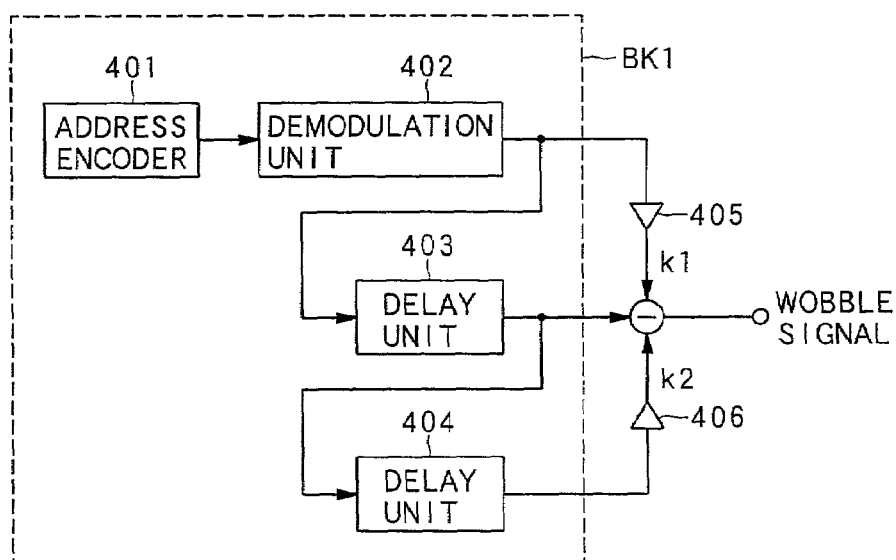
FIG. 19 is a circuit view showing an apparatus for obtaining a wobble signal used in recording wobbles of an optical disc in preferred embodiments.

FIG. 19 is a circuit view showing an apparatus for determining a wobble signal used in recording a wobble of an optical disc. As illustrated in FIG. 19, this apparatus is provided with a three-channel (three tracks) signal generating block BK1 including: an address encoder 401 for supplying encoded address data; a modulation unit 402 for modulating the address data supplied from the address encoder 401 to obtain a wobble signal; and delay units 403 and 404 for recording a wobble signal for one track (one circumference of an optical disk) and supplying a wobble signal at a timing delayed by one track.

According to the circuit, a wobble signal of a track to be recorded (main track) is supplied from the delay unit 403, and wobble signals to be recorded in the both tracks (sub tracks) adjacent to the main track are supplied from the modulation unit 402 and the delay unit 404. A signal obtained by subtracting from the output signal of the delay unit 403, a signal determined by multiplying the output signals from the modulation unit 402 and the delay unit 404 by respective proper coefficients k1 and k2, is recorded in an optical disc. The coefficients of multipliers 405 and 406 to multiply the output signals of the modulation unit 402 and the delay unit 404 by are set at a fixed value. For example, the coefficient k1 and k2 are set at 0 to −0.25 (about −0.1). In the case of addition, instead of subtraction, the coefficient k1 and k2 are set at a fixed value of 0 to +0.25.

Thus, a crosstalk signal having a polarity reversed to the crosstalk generated at playback is subtracted from the wobble signal of a track to be recorded. As a result, the crosstalk generated at playback and the crosstalk having the reversed polarity which is added at a recording time cancel each other out, thereby enabling playback of a wobble signal free from crosstalk (having less crosstalk).

Since the both crosstalk from the tracks adjacent to the sub tracks is not added to the wobble signals supplied from the modulation unit 402 and the delay unit 404, strictly speaking, these wobble signals are different from the actually predicted wobble signals, and therefore the crosstalk as for the main track is not canceled completely.

The coefficients k1 and k2, however, are the values of, for example, −0.1 or so. Therefore, instead of a signal after the crosstalk cancellation, a signal before the crosstalk cancellation can be used practically without any problems. Even if there is an error of about 10 percent (about 0.1) in the value obtained by multiplying a predicted crosstalk signal, namely, a signal before the crosstalk cancellation by the coefficients k1 and k2, the error may affect the wobble signal to be recorded only with the order of 0.1×0.1=0.01 (1%).

Considering the crosstalk with respect to the adjacent tracks (sub track), it may be reflected to the crosstalk cancellation as for the main track. In this case, a wobble signal of the main track (after the crosstalk cancellation) proves to be generated based on the wobble signals in the range of two tracks distant from the main track, that is, the wobble signals of five tracks in total including the main track.

Figure 20:
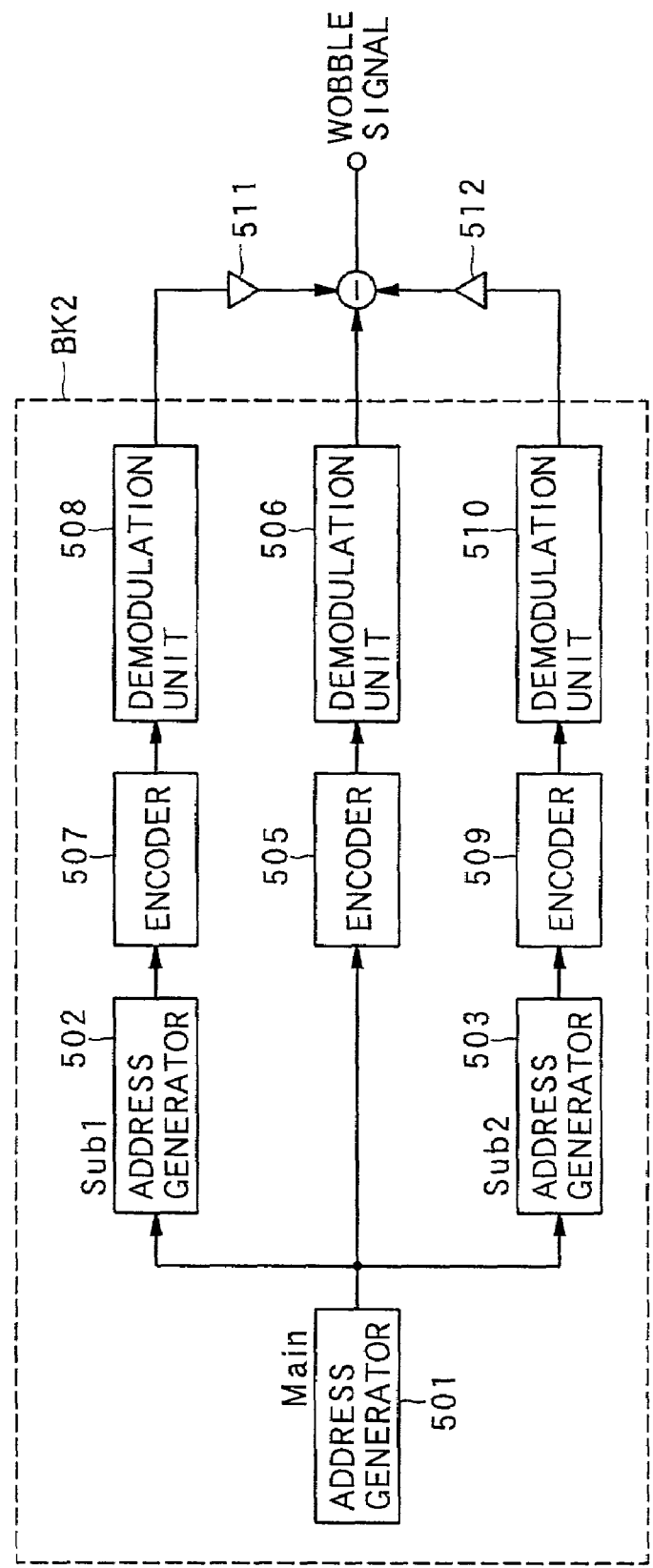
FIG. 20 is a circuit view showing another apparatus for obtaining a wobble signal used in recording wobbles of an optical disc in preferred embodiments.

FIG. 20 is a circuit view showing another apparatus for determining a wobble signal used in recording a wobble of an optical disc. Also in the case of using this apparatus, the same effect as in the case of using the apparatus of FIG. 19 can be obtained.

In this apparatus, instead of generating the wobbles for three tracks by the delay unit, address of each track is generated, encoded, and modulated, thereby obtaining the wobble signals for three channels (three tracks). Since a disc system is standardized in recording start address, radius, and linear recording density, if the address of one track is found, the address of the adjacent tracks can be determined by calculation.

As illustrated in FIG. 20, this apparatus is provided with a three-channel signal generating block BK2 including: an address generator 501 for supplying the address data of a main track to be recorded; address generators 502 and 503 for supplying the address data of the sub tracks adjacent to the main track based on the address data supplied from the address generator 501; an encoder 505 for encoding the output signal of the address generator 501; a modulation unit 506 for modulating the output signal of the encoder 505; an encoder 507 for encoding the output signal of the address generator 502; a modulation unit 508 for modulating the output signal of the encoder 507; an encoder 509 for encoding the output signal of the address generator 503; and a modulation unit 510 for modulating the output signal of the encoder 509.

The modulation unit 506 supplies the wobble signal (before the crosstalk cancellation) of the main track, and the modulation unit 508 and the modulation unit 510 supply the wobble signals of the sub tracks. A signal obtained by subtracting a signal which is determined by multiplying the output signals of the modulation unit 508 and the modulation unit 510 by the proper coefficients k1 and k2, from the output signal of the modulation unit 506, is recorded in an optical disc. The coefficients of multipliers 511 and 512 by which the output signals of the modulation unit 508 and the modulation unit 510 are multiplied are set at a fixed value; for example, the coefficients k1 and k2 are set at 0 to −0.25 (about −0.1) (0 to +0.25 in the case of addition).

As mentioned above, according to the optical recording medium of the present invention, the wobble of a track is formed in a way of previously canceling the crosstalk from the adjacent tracks at playback. Therefore, the crosstalk from the adjacent tracks is equally canceled at actual playback.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2001-70465 filed on Mar. 13, 2001 including the specification, claims, drawings and summary is incorporated herein by reference in its entirety.

What is claimed is:

1. An information playback apparatus for reading information of an optical recording medium, comprising:
   a first detecting device which supplies a difference between respective output signals optically obtained by a pair of detectors for reading information of a first track;
   a second detecting device which supplies a difference between respective output signals optically obtained by a pair of detectors for reading information of a second track adjacent to the first track;
   a first demodulating device which demodulates a detected signal supplied from the first detecting device;
   a second demodulating device which demodulates a detected signal supplied from the second detecting device;

a crosstalk extracting device which extracts crosstalk caused by the second track, which is included in a demodulation signal obtained by the first demodulating device, from the same signal;

a coefficient controlling device which controls a coefficient based on the crosstalk extracted by the crosstalk extracting device; and a crosstalk canceling device for canceling the above crosstalk on the basis of the coefficient calculated by the coefficient controlling device.

2. The information playback apparatus according to claim 1, wherein
the coefficient controlling device calculates a correlation between the crosstalk extracted by the crosstalk extracting device and the demodulation signal obtained by the second demodulating device and controls the coefficient so as to reduce the correlation.

3. The information playback apparatus according to claim 2, wherein
the crosstalk extracting device extracts the crosstalk by comparison between the value of an output signal of the first demodulating device having the crosstalk canceled and two reference levels.

4. The information playback apparatus according to claim 2, wherein
the crosstalk extracting device extracts the crosstalk based on a signal level at a zero cross point in the output signal of the first demodulating device having the crosstalk canceled.

5. The information playback apparatus according to claim 2, wherein
the crosstalk extracting device extracts the crosstalk by comparison of the value of an output signal of the first demodulating device having the crosstalk canceled and the value at a zero cross point of the output signal with three reference levels.

6. The information playback apparatus according to claim 1, wherein
the crosstalk canceling device cancels the crosstalk in a signal before demodulation by the first demodulating device.

7. The information playback apparatus according to claim 1, wherein
the crosstalk canceling device cancels the crosstalk in a demodulated signal by the first demodulating device.

8. The information playback apparatus according to claim 1, wherein
the first detecting device and the second detecting device detect wobbles of tracks formed on the optical recording medium.

9. The information playback apparatus according to claim 1, wherein
the first demodulating device and the second demodulating device demodulate phase-modulated wobbles.

10. The information playback apparatus according to claim 1, further comprising:
a positional deviation compensating device which compensates timing corresponding to each positional deviation of the first detecting device and the second detecting device in a direction of reading information, wherein
the crosstalk canceling device performs the control in a state of adjusting timing between a signal obtained through the first detecting device, the signal being adjusted in good timing by the positional deviation compensating device, and a signal obtained through the second detecting device.

11. The information playback apparatus according to claim 1, further comprising:
a carrier signal reading device which reads a carrier signal of the first track, the carrier signal being supplied to the second demodulating device; and a phase adjusting device for adjusting phase of the carrier signal in accordance with phases of the output signals of the first detecting device and the second detecting device.

12. An information playback apparatus for reading information of an optical recording medium, comprising:
a first detecting device which supplies a difference between respective output signals optically obtained by a pair of detectors for reading information of a first track;

a second detecting device and a third detecting device which respectively supplies a difference between output signals optically obtained by each pair of detectors for reading respective information of a second track and a third track on the both sides adjacent to the first track;

a first demodulating device which demodulates a detected signal supplied from the first detecting device;

a second demodulating device which demodulates a detected signal supplied from the second detecting device;

a third demodulating device which demodulates a detected signal supplied from the third detecting device;

a crosstalk extracting device which extracts crosstalk caused by the second track and the third track, which is included in a demodulation signal obtained by the first demodulating device, from the same signal;

a coefficient controlling device which controls a coefficient based on the crosstalk extracted by the crosstalk extracting device; and a crosstalk canceling device for canceling the above crosstalk on the basis of the coefficient calculated by the coefficient controlling device.

13. The information playback apparatus according to claim 12, wherein
the coefficient controlling device respectively calculates a correlation between the crosstalk extracted by the crosstalk extracting device and the demodulation signal obtained by the second demodulating device and a correlation between the crosstalk extracted by the crosstalk extracting device and the demodulation signal obtained by the third demodulating device, and controls the coefficients for use in the crosstalk canceling device so as to reduce the correlation.

14. The information playback apparatus according to claim 13, wherein
the crosstalk extracting device extracts the crosstalk by comparison between the value of an output signal of the first demodulating device having the crosstalk canceled and two reference levels.

15. The information playback apparatus according to claim 13, wherein
the crosstalk extracting device extracts the crosstalk based on a signal level at a zero cross point in the output signal of the first demodulating device having the crosstalk canceled.

16. The information playback apparatus according to claim 13, wherein
the crosstalk extracting device extracts the crosstalk by comparison of the value of an output signal of the first demodulating device having the crosstalk canceled and the value at a zero cross point of the output signal with three reference levels.

17. The information playback apparatus according to claim 12, wherein
the crosstalk canceling device cancels the crosstalk in a signal before demodulation by the first demodulating device.

18. The information playback apparatus according to claim 12, wherein
the crosstalk canceling device cancels the crosstalk in a demodulated signal by the first demodulating device.

19. The information playback apparatus according to claim 12, wherein
the first detecting device, the second detecting device, and the third detecting device detect wobbles of tracks formed on the optical recording medium.

20. The information playback apparatus according to claim 12, wherein
the first demodulating device, the second demodulating device, and the third demodulating device demodulate phase-modulated wobbles.

21. The information playback apparatus according to claim 12, further comprising
a positional deviation compensating device which compensates timing corresponding to positional deviations of the first detecting device, the second detecting device, and the third detecting device in a direction of reading information, wherein
the crosstalk canceling device performs the control in a state of adjusting timing among a signal obtained through the first detecting device, the signal being adjusted in good timing by the positional deviation compensating device, a signal obtained through the second detecting device, and a signal obtained through the third detecting device.

22. The information playback apparatus according to claim 12, further comprising:
a carrier signal reading device which reads a carrier signal of the first track, the carrier signal being supplied to the second demodulating device and the third demodulating device; and
a phase adjusting device which adjusts phases of the carrier signals in accordance with phases of the output signals of the first detecting device, the second detecting device, and the third detecting device.

23. A crosstalk canceling method of canceling a crosstalk in an information playback apparatus having a first detecting device which supplies a difference between respective output signals optically obtained by a pair of detectors which reads information of a first track of an optical recording medium and a second detecting device which supplies a difference between respective output signals optically obtained by a pair of detectors for reading information of a second track adjacent to the first track, the method comprising:
a first demodulating process for demodulating a detected signal supplied from the first detecting device;
a second demodulating process for demodulating a detected signal supplied from the second detecting device;
a crosstalk extracting process for extracting crosstalk caused by the second track, which is included in a demodulation signal obtained in the first demodulating process, from the same signal;
a coefficient controlling process for controlling a coefficient based on the crosstalk extracted by the crosstalk extracting process; and
a crosstalk canceling process for canceling the above crosstalk on the basis of the coefficient calculated by the coefficient controlling process.

24. A crosstalk canceling method of canceling a crosstalk in an information playback apparatus having a first detecting device which supplies a difference between respective output signals optically obtained by a pair of detectors for reading information of a first track of an optical recording medium and a second detecting device and a third detecting device for respectively supplying a difference between respective output signals optically obtained by each pair of detectors for reading respective information of a second track and a third track on the both sides adjacent to the first track, the method comprising:
a first demodulating process for demodulating a detected signal supplied from the first detecting device;
a second demodulating process for demodulating a detected signal supplied from the second detecting device;
a third demodulating process for demodulating a detected signal supplied from the third detecting device;
a crosstalk extracting process for extracting crosstalk caused by the second track and the third track, which is included in a demodulation signal obtained by the first demodulating process, from the same signal; and
a coefficient controlling process for controlling a coefficient based on the crosstalk extracted by the crosstalk extracting process; and
a crosstalk canceling process for canceling the above crosstalk on the basis of the coefficient calculated by the coefficient controlling process.

25. A signal processing apparatus that is applied to an information playback apparatus for reading information of an optical recording medium, comprising: a first detecting device which supplies a difference between respective output signals optically obtained by a pair of detectors for reading information of a first track of the optical recording medium; and a second detecting device which supplies a difference between respective output signals optically obtained by a pair of detectors for reading information of a second track adjacent to the first track, the signal processing apparatus comprising:
a first demodulating device which demodulates a detected signal supplied from the first detecting device;
a second demodulating device which demodulates a detected signal supplied from the second detecting device;
a crosstalk extracting device which extracts crosstalk caused by the second track, which is included in a demodulation signal obtained by the first demodulating device, from the same signal;
a coefficient controlling device which controls a coefficient based on the crosstalk extracted by the crosstalk extracting device; and
a crosstalk canceling device for canceling the above crosstalk on the basis of the coefficient calculated by the coefficient controlling device.

26. A signal processing apparatus that is applied to an information playback apparatus for reading information of an optical recording medium, comprising: a first detecting device which supplies a difference between respective output signals optically obtained by a pair of detectors for reading information of a first track of the optical recording medium; and a second detecting device and a third detecting device which respectively supplies a difference between output signals optically obtained by each pair of detectors for reading respective information of a second track and a third track on the both sides adjacent to the first track, the signal processing apparatus comprising:
- a first demodulating device which demodulates a detected signal supplied from the first detecting device;
- a second demodulating device which demodulates a detected signal supplied from the second detecting device;
- a third demodulating device which demodulates a detected signal supplied from the third detecting device;
- a crosstalk extracting device which extracts crosstalk caused by the second track and the third track, which is included in a demodulation signal obtained by the first demodulating device, from the same signal;
- a coefficient controlling device which controls a coefficient based on the crosstalk extracted by the crosstalk extracting device; and
- a crosstalk canceling device for canceling the above crosstalk on the basis of the coefficient calculated by the coefficient controlling device.

* * * * *